(12) United States Patent
Khsib

(10) Patent No.: US 11,622,123 B1
(45) Date of Patent: Apr. 4, 2023

(54) FILM GRAIN PRESERVATION

(71) Applicant: Amazon Technologies, Inc., Seattle, WA (US)

(72) Inventor: Ramzi Khsib, Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/465,519

(22) Filed: Sep. 2, 2021

(51) Int. Cl.
| | | |
|---|---|---|
| *H04N 19/513* | (2014.01) | |
| *H04N 19/85* | (2014.01) | |
| *H04N 19/122* | (2014.01) | |
| *H04N 19/124* | (2014.01) | |
| *H04N 19/176* | (2014.01) | |

(52) U.S. Cl.
CPC ......... *H04N 19/513* (2014.11); *H04N 19/122* (2014.11); *H04N 19/124* (2014.11); *H04N 19/176* (2014.11); *H04N 19/85* (2014.11)

(58) Field of Classification Search
CPC ... H04N 19/176; H04N 19/513; H04N 19/124
See application file for complete search history.

(56) References Cited

U.S. PATENT DOCUMENTS

| | | | | |
|---|---|---|---|---|
| 5,805,207 A | * | 9/1998 | Watkinson | H04N 5/253 348/E5.049 |
| 2005/0162565 A1 | * | 7/2005 | Zhen | H04N 5/145 348/700 |
| 2007/0160138 A1 | * | 7/2007 | Wedi | H04N 19/60 375/240.03 |
| 2016/0198165 A1 | * | 7/2016 | Zhou | H04N 19/137 375/240.16 |
| 2019/0158885 A1 | * | 5/2019 | Mora | H04N 19/146 |

OTHER PUBLICATIONS

Dai et al., "Film grain noise removal and synthesis in video coding," in 2010 IEEE International Conference on Acoustics, Speech and Signal Processing, IEEE, 2010, pp. 890-893.

Hinden et al., "Unique Local IPv6 Unicast Addresses", Network Working Group, Request for Comments: 4193, Oct. 2005, 16 pages.

Oh et al., "Advanced film grain noise extraction and synthesis for high-definition video coding," IEEE transactions on circuits and systems for video technology, vol. 19, No. 12, Dec. 2009, pp. 1717-1729.

RDD May 2006, "SMPTE Registered Disclosure Document: Film Grain Technology—Specifications for H.264 | MPEG-4 AVC Bitstreams," The Society of Motion Picture and Television Engineers, Mar. 6, 2006, pp. 1-18.

Rekhter et al., "Address Allocation for Private Internets", Network Working Group, Request for Comments: 1918, Feb. 1996, 9 pages.

(Continued)

*Primary Examiner* — Zhubing Ren
(74) *Attorney, Agent, or Firm* — Nicholson De Vos Webster & Elliott LLP

(57) ABSTRACT

Techniques for selectively preserving film grain for video encoding are described. In certain embodiments, a content delivery system and/or service determines one or more blocks of a frame to preserve film grain in the encoding in contrast to preserving the film grain in the encoding of all of the blocks of the frame.

18 Claims, 18 Drawing Sheets

(56) References Cited

OTHER PUBLICATIONS

Rivaz et al., "Av1 Bitstream & Decoding Process Specification," Codec Working Group Chair, Adrian Grange, Google LLC, Version 1.0.0 with Errata 1, The Alliance for Open Media, 2018, 681 pages.
Wedi et al., "Quantization Offsets for Video Coding", IEEE, 2005 IEEE International Symposium on Circuits and Systems, May 2005, pp. 324-327.
Yan et al., "Signal-dependent film grain noise removal and generation based on higher-order statistics," in Proceedings of the IEEE Signal Processing Workshop on Higher-Order Statistics, IEEE, 1997, pp. 77-81.

* cited by examiner

FIG. 5 — PIXEL DIFFERENCE BETWEEN CONSECUTIVE FRAMES 500

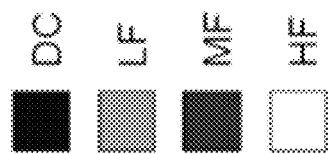
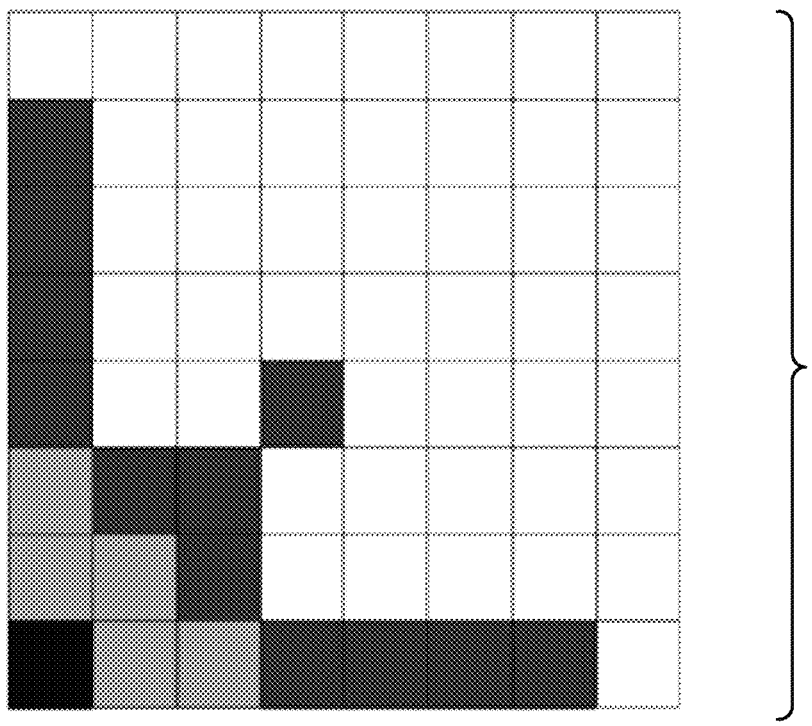
FIG. 7

FILM GRAIN PRESERVATION

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

FIG. 7 illustrates a spatial frequency distribution diagram for an 8×8 DCT block according to some embodiments.

DETAILED DESCRIPTION

Figure 1:
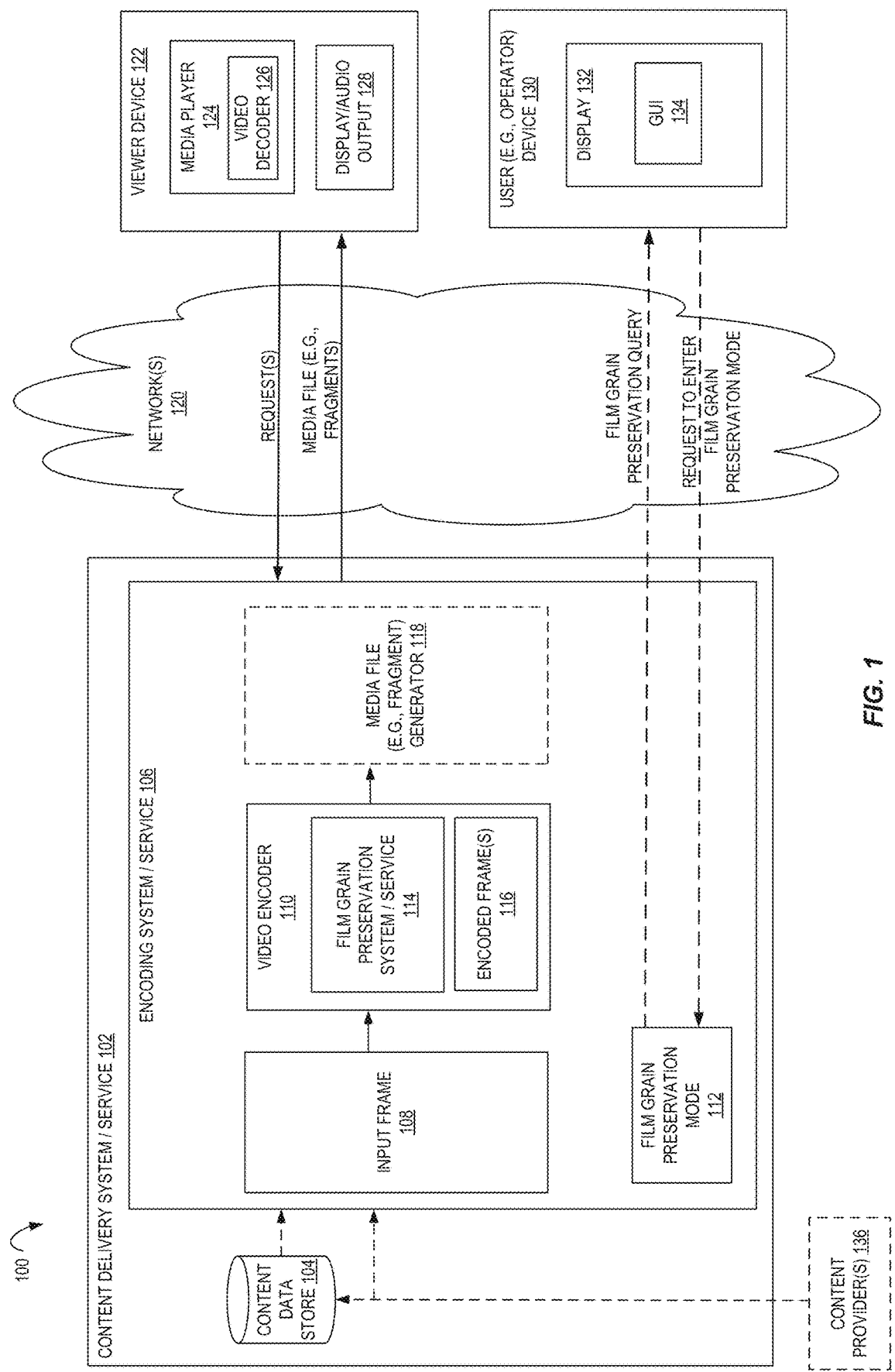
FIG. 1 is a diagram illustrating an environment including a content delivery system/service, having a video encoder including a film grain preservation system/service, to send encoded frame(s) to a viewer device according to some embodiments.

The present disclosure relates to methods, apparatus, systems, and non-transitory computer-readable storage media for selectively preserving film grain for video (e.g., frame) encoding. In certain embodiments, a content delivery system and/or service determines one or more blocks of a frame to preserve film grain in the encoding, e.g., in contrast to preserving the film grain in the encoding of all of the blocks of the frame. Film grain noise in videos (e.g., motion pictures) is valued by (e.g., film) directors for its artistic value and praised by viewers for its aesthetics. Compressing content with film grain noise is challenging as it reduces the coding efficiency. To meet bandwidth constraints, coarse quantization may be used, but leads to undesirable artifacts such as excessive blurriness, banding artifacts, and a washed-out look. Embodiments herein are directed to a systematic approach to improve film grain compression. Embodiments herein are decoder compliant (e.g., without using film grain synthesis in the decoder) and/or can be generalized to any hybrid video compression system, e.g., that uses both predictive motion estimation (e.g., in the pixel domain) and a frequency transform (e.g., in the frequency domain). Embodiments herein apply perceptual models to optimize compression decisions to preserve film grain, e.g., the look of film grain. Embodiments herein achieve an improvement in visual quality for an encoded video while preserving the fidelity and artistic intent of film grain at a minimal (e.g., less than 1%) computational increase. Embodiments herein provide for a reduced computational load, e.g., making them suitable for live and video-on-demand (VOD) encode scenarios.

In certain embodiments, the film grain (e.g., having a grain intensity and a grain pattern) is the random optical texture of processed photographic film due to the presence of small particles of a metallic silver, or dye clouds, developed from silver halide that have received enough photons. While film grain is a function of such particles (or dye clouds) it is not the same thing as such. It is an optical effect, the magnitude of which (amount of grain) depends on both the film stock and the definition at which it is observed. In certain embodiments, film grain occurs as part of using an analog film stock (e.g., celluloid) to record a video (e.g., by an analog camera). In other embodiments, film grain is added after the video (e.g., frame) is recorded on digital media (e.g., by a digital camera).

In certain embodiments, film grain noise in motion pictures is caused by the developing process of silver-halide crystals dispersed in photo-graphic emulsion. In certain embodiments, film grain creates an overlay texture that is valued by film directors for its artistic value. User studies have shown that viewers have a clear preference to images/videos with film grain noise. In the digital camera era, videos created by digital camera sensors have film grain added in post-production for the "cinematic" look in certain embodiments, e.g., and this noise is uncorrelated between the samples and has similar spatial characteristics to film grain. In certain embodiments, film grain is modeled as a stochastic process with high spatio-temporal randomness. The spatio-temporal randomness of film grain challenges video compression core tools: motion estimation and residual transform/quantization. In certain embodiments, preserving film grain over an entire frame comes at a prohibitive cost of higher bitrate, e.g., requiring over a 50% increase in the bit rate to retain the desired film grain (e.g., film grain sharpness).

Embodiments herein may be utilized in a live and/or on-demand encoder. Embodiments herein may be utilized in a device or product with screen casting capabilities, e.g., which require reencoding. Embodiments herein may be utilized on other creatively intended noise.

A video encoder and/or decoder as discussed herein may operate according to a video encoding and/or decoding standard. In one embodiment, the video encoding and/or decoding standard is an Advanced Video Coding (AVC) standard, for example, a H.264 standard, a High Efficiency Video Coding (HEVC) standard (e.g., a H.265 standard), an Essential Video Coding (EVC) standard, or a Versatile Video Coding (VVC) standard (e.g., a H.266 standard).

Two categories of addressing video compression in the presence of film grain noise are (i) film grain synthesis and (ii) film grain perceptual fidelity (e.g., film grain preservation). In certain embodiments, film grain synthesis removes the film grain, estimates grain parameters, and uses the grain parameters on the playback side to overlay grain particles (e.g., by the decoder).

In certain embodiments, the process of determining the parameters that characterize the film grain is referred to as film grain synthesis, e.g., as part of a video encoding standard. In one embodiment, with film grain synthesis, a source video including film grain is analyzed, the film grain is removed, parameters (e.g., metadata) describing the removed grain are determined, the degrained content is encoded, and the film grain parameters (e.g., metadata) are sent to the viewer device along with the encoded video. On playback, the encoded video is decoded, and the grain is added back in per the parameters (e.g., metadata).

However, certain codecs (e.g., coder and/or decoder) do not support film grain synthesis, e.g., such that the metadata is not able to be utilized by the decoder. Embodiments herein allow for the inclusion of certain frequency coefficients of film grain for video (e.g., frame) encoding, e.g., such that a decoder that does not support film grain synthesis is able to decode a video that includes film grain (e.g., such that the film grain is visible to the user to present a desired viewing experience).

A standard may include an (optional) extension for film grain synthesis, but a particular viewer device (e.g., decoder thereof) may not support film grain synthesis, e.g., that particular device may not include an extension for film grain synthesis, and thus not support adding film grain back in according to the film grain synthesis. For example, a standard may include supplemental enhancement information (SEI) messages to the decoder where grain is generated and added to the decoded picture. A standard may use film grain synthesis to address the prohibitive cost of encoding film grain. However, certain decoders do not support film grain synthesis, leading to an obsolete feature.

In certain embodiments, film grain synthesis is done in four steps: film grain parameters estimation from source, remove film grain noise or "degrain" the source, encode the denoised version, and attach film grain parameters to the bitstream, e.g., and the decoder will overlay the synthesized film grain. This solution has major problems: computational cost and film grain fidelity is far from optimal, the degrain process is a destructive process, and there are challenges in film grain parameters estimation.

In certain embodiments herein, encoding a video does not include utilizing film grain parameters, for example, film grain metadata, e.g., determined according to a video encoding standard (e.g., a film grain synthesis standard or extension to a standard).

Certain embodiments herein instead increase film grain perceptual fidelity, for example, by utilizing film grain preservation, film grain restoration, and/or film grain enhancement (e.g., such that the encoded video does not include separate parameters for film grain, e.g., does not include film grain metadata).

In certain embodiments, the quantization process (e.g., in a H.264/AVC standard) is changed such that a quantization offset is updated in the presence of film grain to reduce grain sharpness loss, however this quantization offset requires changes on the decoder (e.g., the decoder specification) making the adoption of this idea virtually impracticable.

Embodiments herein utilize an algorithm for increasing the perceptual fidelity of film grain (e.g., by minimizing and/or removing any artifacts in a video), for example, by film grain preservation, film grain restoration, and/or film grain enhancement (e.g., on a block-by-block basis) that achieves a (e.g., up to 8%) bandwidth reduction while preserving film grain aesthetic look with a minimal (e.g., less than 1%) computation increase. In certain embodiments, the algorithm is compliant to an encoding/decoding standard (e.g., a H.264/AVC or HEVC specification), for example, such that no changes are required on the decoder side. In certain embodiments, the algorithm is a non-destructive algorithm, e.g., no filtering is applied on the original video data (e.g., frame).

FIG. 1 is a diagram illustrating an environment 100 including a content delivery system/service 102, having a video encoding system/service 106 including a film grain perceptual fidelity (e.g., preservation) system/service 114, to send encoded frame(s) to a viewer device according to some embodiments. In certain embodiments, encoding system/service 106 operates in accordance with a video coding (e.g., encoding) standard. In certain embodiments, video decoder 126 operates in accordance with a video coding (e.g., decoding) standard. As discussed herein, certain video decoders 126 (e.g., certain medial players 124) may not support adding in film grain according to parameters (e.g., metadata) provided to the video decoder 126. Certain embodiments herein are directed to an encoding system and/or service 106 that includes a film grain preservation mode 112, e.g., that preserves film grain in the encoded video. Embodiments herein allow for the inclusion of film grain in an encoded video (e.g., frame) without the video decoder 126 in a viewer device 122 supporting (or being modified to support) film grain synthesis.

Encoding may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Encoding system/service 106 may include film grain preservation service 114 to preserve the film grain in an encoded version (e.g., encoded frame(s) 116) of the provided video (or image) file (e.g., input frame(s) 108), e.g., such that certain of the film grain is included when displaying the video.

Embodiments herein provide for a mode 112 that preserves the film grain of the source, for example, by utilizing a localized approach, e.g., as visibility of film grain does not occur in all regions of the pictures with equal amounts. Certain embodiments herein utilize a mechanism that measures the visibility and adjusts quantization and/or encoder decisions (e.g., from joint perceptual/bit usage sense) based on that visibility. Certain embodiments herein only preserve (e.g., or substantially preserve) film grain in a proper subset of the blocks in a single frame, e.g., only in the blocks that have a higher sensitivity to distortion. In certain embodiments, video encoder 110 includes film grain within the frequency coefficients of the proper subset of blocks of the single frame to generate the encoded frame 116.

An encoding algorithm (e.g., specified by a video encoding standard) may select between inter and intra coding for (e.g., block-shaped) regions of each picture (e.g., frame 108). In certain embodiments, inter coding (e.g., as indicated by an "inter" mode) uses motion vectors for (e.g., block-based) inter prediction from other pictures (e.g., frames) to exploit temporal statistical dependencies between different pictures. Reference pictures (e.g., reference frames) may be stored in a reference picture buffer in encoding system/service 106. In certain embodiments, intra coding uses various spatial predictions to exploit spatial statistical dependencies in the source signal for a single picture (e.g., frame). In certain embodiments, motion vectors and intra prediction modes are specified for a variety of block sizes in the picture. In certain embodiments, the prediction residual is then further compressed using a (e.g., frequency) transform to remove spatial correlation inside the transform block before it is quantized, producing an irreversible process that typically discards less important visual information while forming a close approximation to the source samples. In certain embodiments, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode. An inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform. An intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

In certain embodiments, encoding system/service 106 includes a field, that when set, causes entry into film grain perceptual fidelity (e.g., preservation) mode 112. In one embodiment, storing a first value into field for film grain preservation mode 112 causes the video encoder 110 (e.g., film grain preservation system/service 114) to selectively preserve the film grain of certain portions of the source to generate encoded frame(s) 116, for example, and storing a second, different value into the field causes the video encoder 110 (e.g., film grain preservation system/service 114) to instead not preserve the film grain according to this disclosure in the encoded frame(s) 116.

The depicted content delivery system/service 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream) by video encoder 110 (e.g., by media file (e.g., fragment) generator 118). In certain embodiments, the (e.g., client) viewer device 122 requesting the media file (e.g., fragment(s) of media) from content delivery system/service 102 causes the encoding system/service 106 (e.g., video encoder 110 thereof) to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

In certain encoding embodiments, a frequency transformation on pixel values of a frame (or image) generates frequency coefficient values, and a quantization on the frequency coefficient values generates quantized frequency coefficient values that are then encoded. As one example, a frequency transformation is performed on a block of pixel values (e.g., an 8 pixel by 8 pixel block of 64 pixel values). In certain embodiments, a frequency transformation is a discrete cosine transform (DCT).

In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., video encoder 110 thereof) is to send a query (e.g., asking if the film grain preservation mode 112 is desired) to user (e.g., operator) device 130, for example, and the user device 130 (e.g., in response to a command from a user of the device 130) is to send a response (e.g., an indication to enter or not enter "film grain preservation" mode 112). Depicted user device 130 includes a display 132 having a graphical user interface (GUI) 134, e.g., to display a query for video encoder 110 to enter (or not enter) film grain preservation mode 112.

Depicted viewer device 122 (e.g., where the viewer is a customer of user (e.g., operator) of device 130) includes a media player 124 having a video decoder 126 to decode the media file (e.g., fragment) from the content delivery system/service 102, e.g., to display video and/or audio of the media file on display and/or audio output 128, respectively. As discussed herein, the decoder 126 may not support adding film grain to the video it is decoding, e.g., not support adding film grain based on film grain parameters (e.g., metadata sent along with, but separate data from, encoded frame(s) 116 (e.g., frames in media fragments)).

Figure 2:
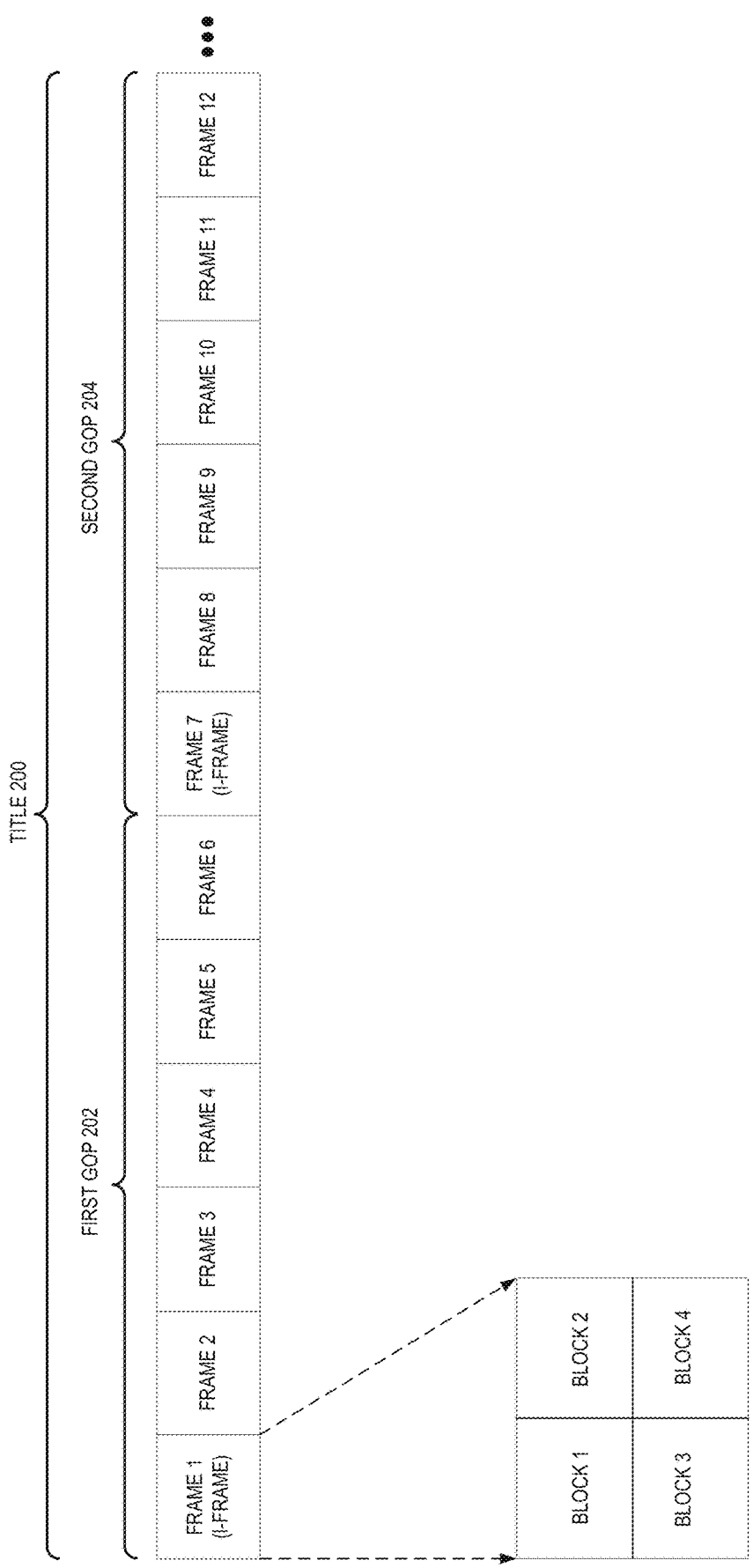
FIG. 2 is a diagram illustrating a title having a plurality of groups of pictures, and a frame formed from a plurality of blocks (e.g., macroblocks) according to some embodiments.

FIG. 2 is a diagram illustrating a title (e.g., film) 200 having a plurality of groups of pictures 202, 204, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In some embodiments, a macroblock is a proper subset of pixels of a frame used as the basic processing unit of the video encoding/decoding. An example macroblock is a (e.g., 16×16) block of (e.g., 256) luma samples and two corresponding blocks of chroma samples. A macroblock can be further partitioned for inter prediction. In one embodiment, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously decoded pictures (e.g., reference frame(s)). In certain embodiments, motion vectors are encoded differentially with respect to predicted values formed from nearby encoded motion vectors. In one embodiment, an encoder calculates appropriate motion vectors and other data elements represented in the video data stream. This motion estimation process in the encoder and/or the selection of whether to use inter prediction for the representation of each region of the video content may be specified by an encoding standard.

In certain embodiments, each pixel value in a frame is converted from a first format (e.g., corresponding to a value scale of a given bit width) to a second, different format (e.g., corresponding to a different value scale of a different, given bit width), for example, pixel values converted from 10-bit wide values to 8-bit wide values.

Certain embodiments here perform a film grain preservation analysis on a sub-component of title 200, e.g., on a block-by-block basis.

What follows is a discussion on film grain characteristics and the challenges it poses for a video compression system, and then example components, methods, and algorithms (e.g., algorithmic changes) used to preserve film grain.

Since film grain noise may be considered an overlay noise over real scene pixels, certain embodiments of a film grain parameters estimation solution opt to extract grain information from homogeneous regions. This selection allows separation of grain signature from the underlying texture. The other motivation on focusing solely on flat regions is the compression distortion visibility is higher in homogeneous regions compared to random textured regions in certain embodiments. For example, where the objectionable blurriness is primarily observed in flat regions and fine texture areas, e.g., sky gradients, skin tones, etc.

The below disclosure focuses mainly on regions of the images where distortion perception in film grain is higher, however any reference to film grain noise may refer to film grain regions with high distortion sensitivity.

Film grain noise is drastically different from other noise signature like the Gaussian noise. It has the Gaussian-like spatial distribution while its power spectrum density is close to pink noise. Modeling film grain noise as pink noise is justified by the following properties: existence of considerable low frequency component in opposition to reduced presence of low frequencies in white noise, equal energy spread in all frequency bands, and similar to pink noise which is considered perceptually important, film grain removal process might bring an unnatural feeling, e.g., as pink noise is actually beneficial to brain activity. In certain embodiments, pink noise has a frequency spectrum such that the power spectral density (e.g., power per frequency interval) is inversely proportional to the frequency of the signal, for example, where each octave interval (halving or doubling in frequency) carries an equal amount of noise energy.

From spatial and statistical analysis, it is shown that film grain and camera noise in flat regions are showing the unique property of having low variance while containing a high frequency component with equal spread while white noise has high spatial variance.

Figure 3:
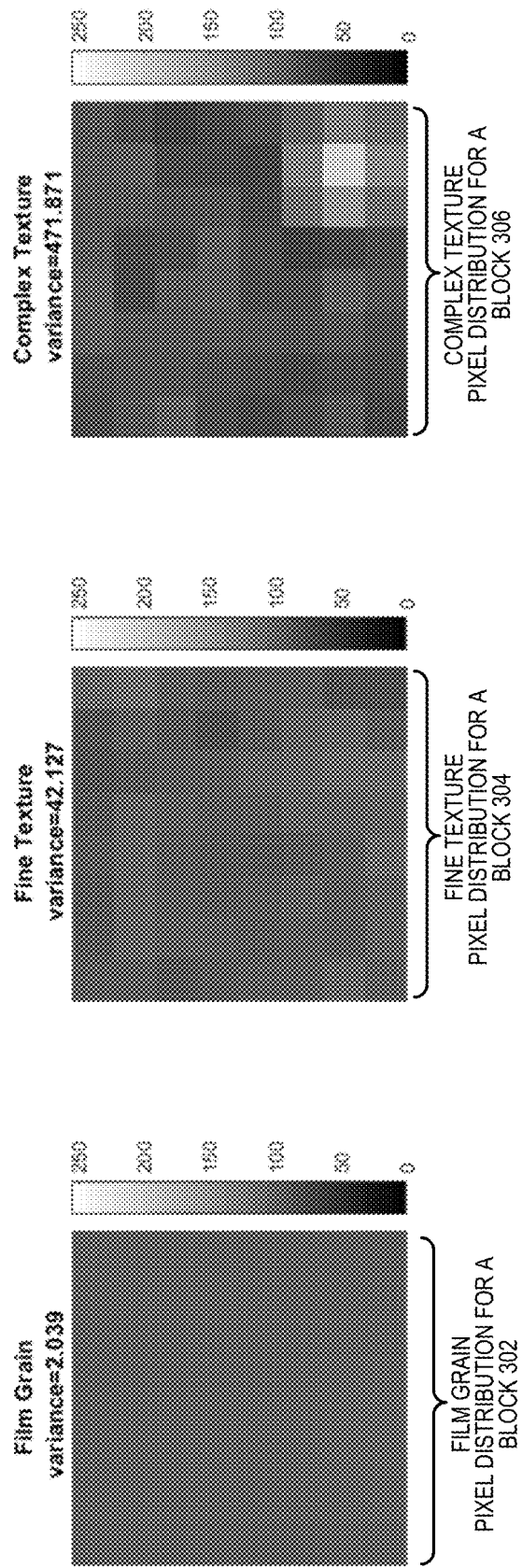
FIG. 3 is a diagram illustrating pixel distribution for three different block classes according to some embodiments.
Figure 4:
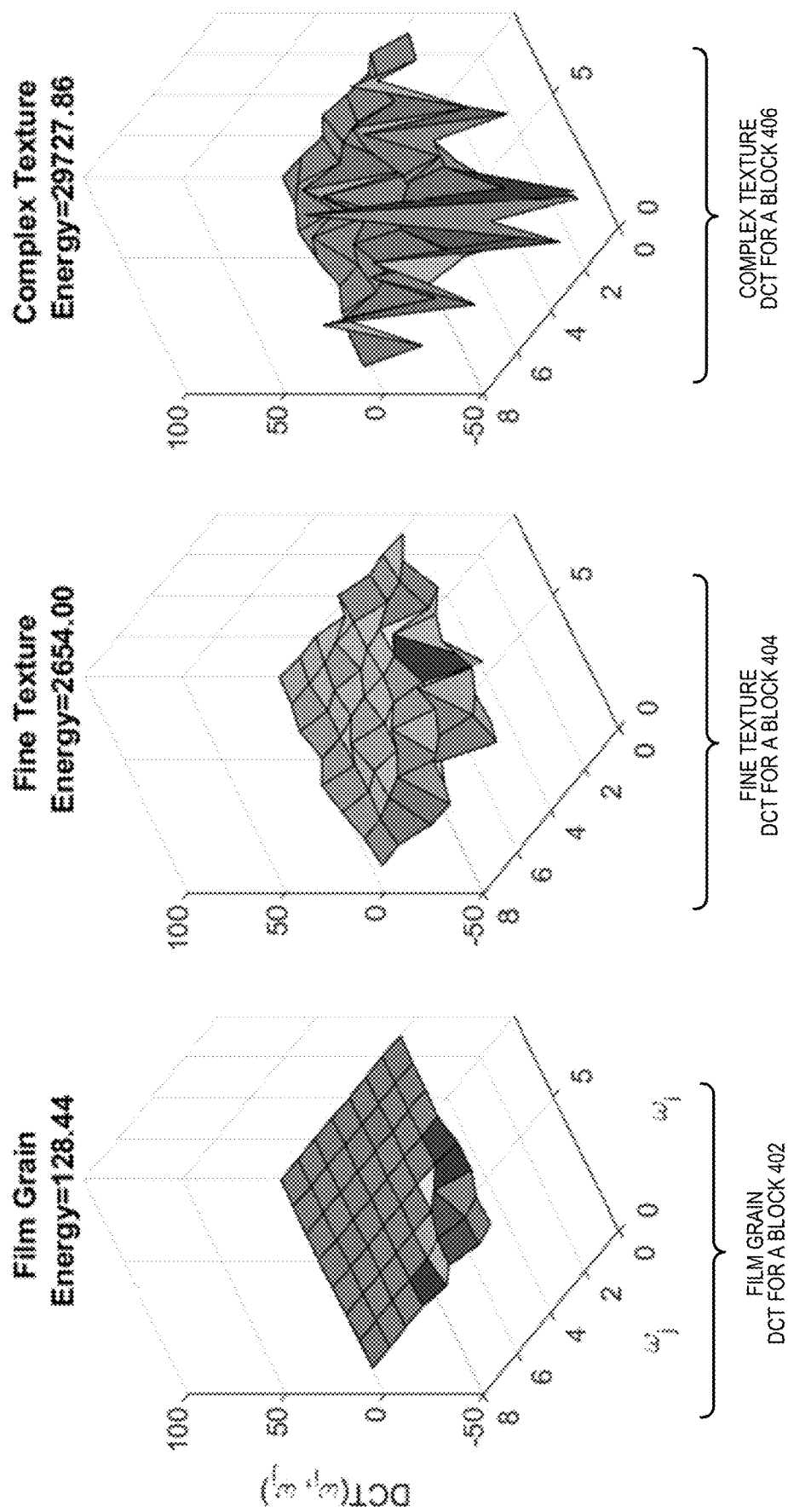
FIG. 4 is a diagram illustrating discrete cosine transform (DCT) values for three different block classes in FIG. 3 according to some embodiments.

FIG. 3 is a diagram illustrating pixel distribution for three different block (e.g., an 8 pixel by 8 pixel block) classes (film grain at 302, fine texture at 304, and complex texture at 306) according to some embodiments. FIG. 4 is a diagram illustrating discrete cosine transform (DCT) values for three different block (e.g., an 8 pixel by 8 pixel block) classes in FIG. 3 (film grain at 402, fine texture (e.g., background) at 404, and complex (e.g., foreground) texture at 406) according to some embodiments.

FIGS. 3-4 illustrate that film grain blocks have reduced range compared to the other classes. Contrary to a belief that film grain has high amplitude in the high frequencies spectrum, deeper analysis indicates that the high frequency component does exist but in smaller amplitude. The explanation is film grain pixel values do fluctuate within a block but the fluctuation has a limited range given adequate block size, e.g., 8×8 sized block of pixels. The frequency domain signature of film grain for an adequate block size (e.g., 8×8) is closer to uniform texture rather than random texture. Since these high frequency components have reduced amplitude, the use of a nominal quantizer (e.g., nominal being a mid-range quantization parameter on a scale of multiple quantization parameters) will not preserve film grain texture and blurriness/softness artifacts is not avoidable in certain embodiments. The need for smaller quantizer (and larger bit usage) to preserve grain is attributed to the design of quantization operation in hybrid codecs, e.g., such AVC, HEVC, AV1. Quantization by design in certain encoders will preserve the low/mid-range frequencies while heavily filtering the higher end of the frequency spectrum. This design choice is justified in that noise resides mostly in high frequencies, but this assumption leads to non-optimal film grain compression. Thus, in certain embodiments, film grain fidelity (e.g., preservation) is achieved by lowering the quantization step, e.g., such that a smaller quantization parameter preserves small amplitude high frequencies as these frequencies are essential to preserving a film grain look.

Figure 5:
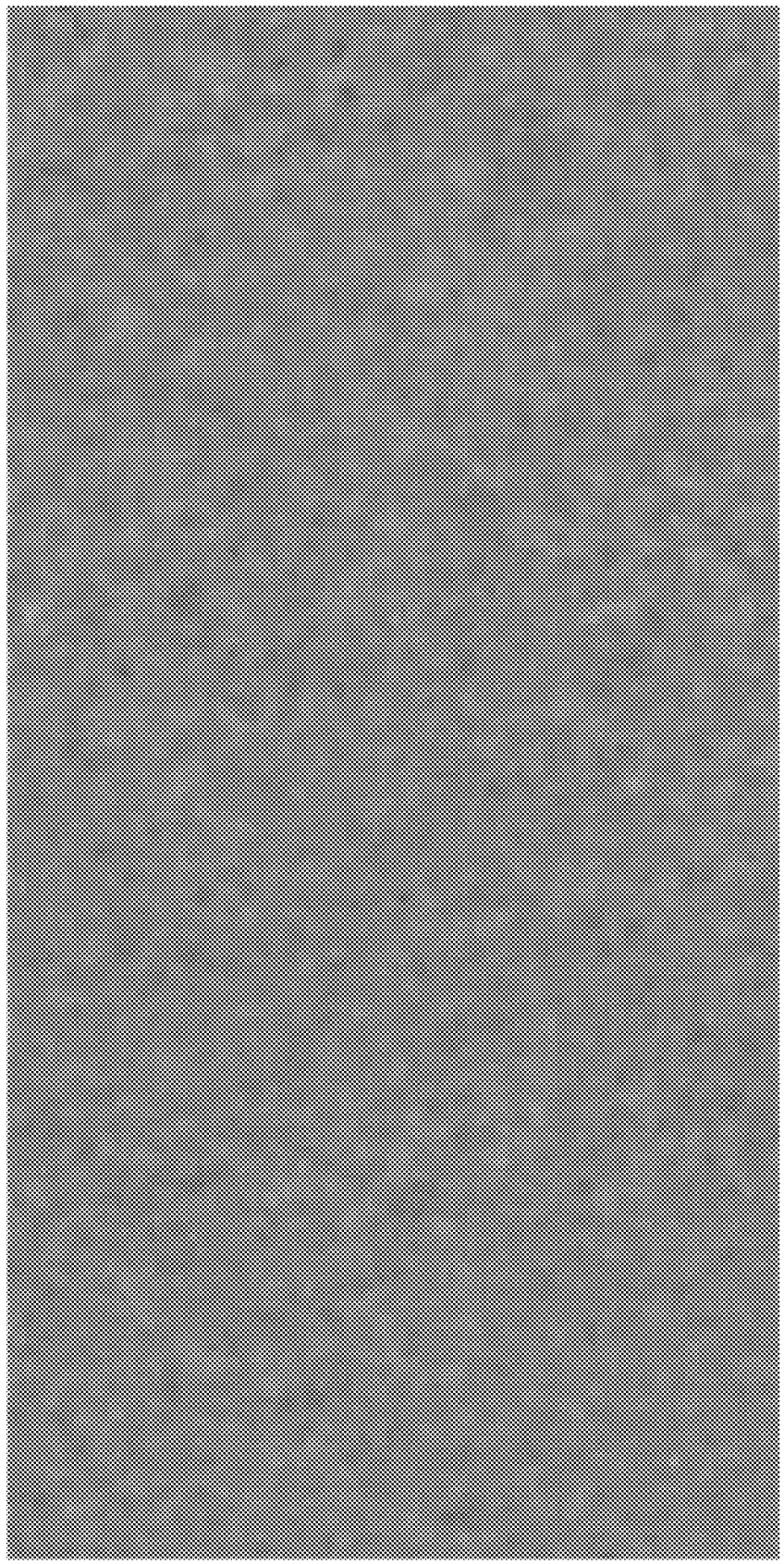
FIG. 5 illustrates pixel difference between consecutive frames according to some embodiments.

FIG. 5 illustrates pixel difference 500 between consecutive frames according to some embodiments. Film grain is temporally uncorrelated, e.g., it cannot easily be predicted by motion compensated prediction. FIG. 5 shows that even for a motion vector field that is determined to be "stationary" (e.g., no motion) between consecutive frames, the pixel value difference from film grain between these "stationary" frames is random. As a consequence, most of the film grain remains in the prediction error as shown in FIG. 5. Since the grain is represented in small prediction error values, it can be found in small transform coefficients. One reason for the film grain removal is a relatively large rounding offset (e.g., dead-zone) size as discussed below, e.g., where the modification of the dead-zone is connected directly to the intensity of the remaining film grain. If the dead zone size is reduced, more grain is visible, and if the dead-zone is increased, less grain is visible. With the optimal dead-zone size, the picture quality of grainy videos (e.g., movies) can be improved significantly.

As discussed above, film grain noise has some unique properties. The frequency domain signature of film grain for an adequate block size (e.g., 8×8) is closer to uniform texture than complex texture. Since these high frequency components have reduced amplitude, the use of a nominal quantizer (where nominal is a middle-range quantization parameter, e.g., 30's range in AVC) will not preserve film grain texture and blurriness artifacts are not avoidable in certain embodiments. The need for smaller quantizer (and larger bit usage) to preserve grain is attributed to the design of quantization operation in certain (e.g., hybrid) codecs. In certain embodiments, quantization in these encoders will preserve the low and mid-range frequencies while heavily filtering the higher end of frequency spectrum. This design choice is motivated by the fact that noise resides mostly in high frequencies, but this assumption leads to non-optimal film grain compression. Film grain preservation may be achieved by lowering the quantization step to preserve small amplitude high frequencies that are essential to providing the film grain organic look. However, in certain embodiments the bitrate increase to so is prohibitive and this approach is not always perceptually ideal. One solution is to use a "film" or "grain" preset in an encoder, but three major limitations making their adoption impracticable: film grain softness is reduced but not completely solved, the increase in bitrate is drastic, in some cases there is a 3×increase, and there are side effects on non-film grain requiring per content manual intervention.

To address these issues, embodiments herein utilize a localized approach, e.g., because visibility of film grain does not occur in all regions of the pictures with equal amounts. Certain embodiments herein measure the visibility of film grain and adjusts quantization and/or encoder decisions (e.g., from joint perceptual/bit usage sense), respectively. Certain embodiments herein utilize a contrast masking paradigm applied to film grain, e.g., where sensitivity to film grain loss differs between blocks of a frame. In contrast to adjusting quantization and/or encoder decisions (e.g., control values) at a frame level approach, this localized (e.g., block by block or macroblock by macroblock) approach spends the bits where there is a (e.g., greatest) potential of perceptual loss. Within a block, certain embodiments utilize a perceptual model (e.g., contrast sensitivity function) to modulate the amount of preservation on a coefficient level to target only the bands of frequencies that retain the film grain organic. In certain embodiments, combining two modulation factors (e.g., $d_{block}$ and Dead Zone Scale discussed below) substantially limits any increase of bit usage in the case of film grain. Certain embodiments here are utilized with a codec, e.g., AVC, HEVC, or any codec that follows the same quantization scheme as AVC. Certain embodiments herein implement a film grain perceptual fidelity (e.g., preservation) scheme that solves one or more of the following constraints: failure of motion compensated prediction (e.g., excessive use of intra blocks in inter frames), loss of texture due to a combination of a large quantization step and a wider dead zone, preserve the sharpness with limited increase in bit usage, and/or computation load is minimal, e.g., for a target application of live encoding and/or VOD encoding.

Figure 6:
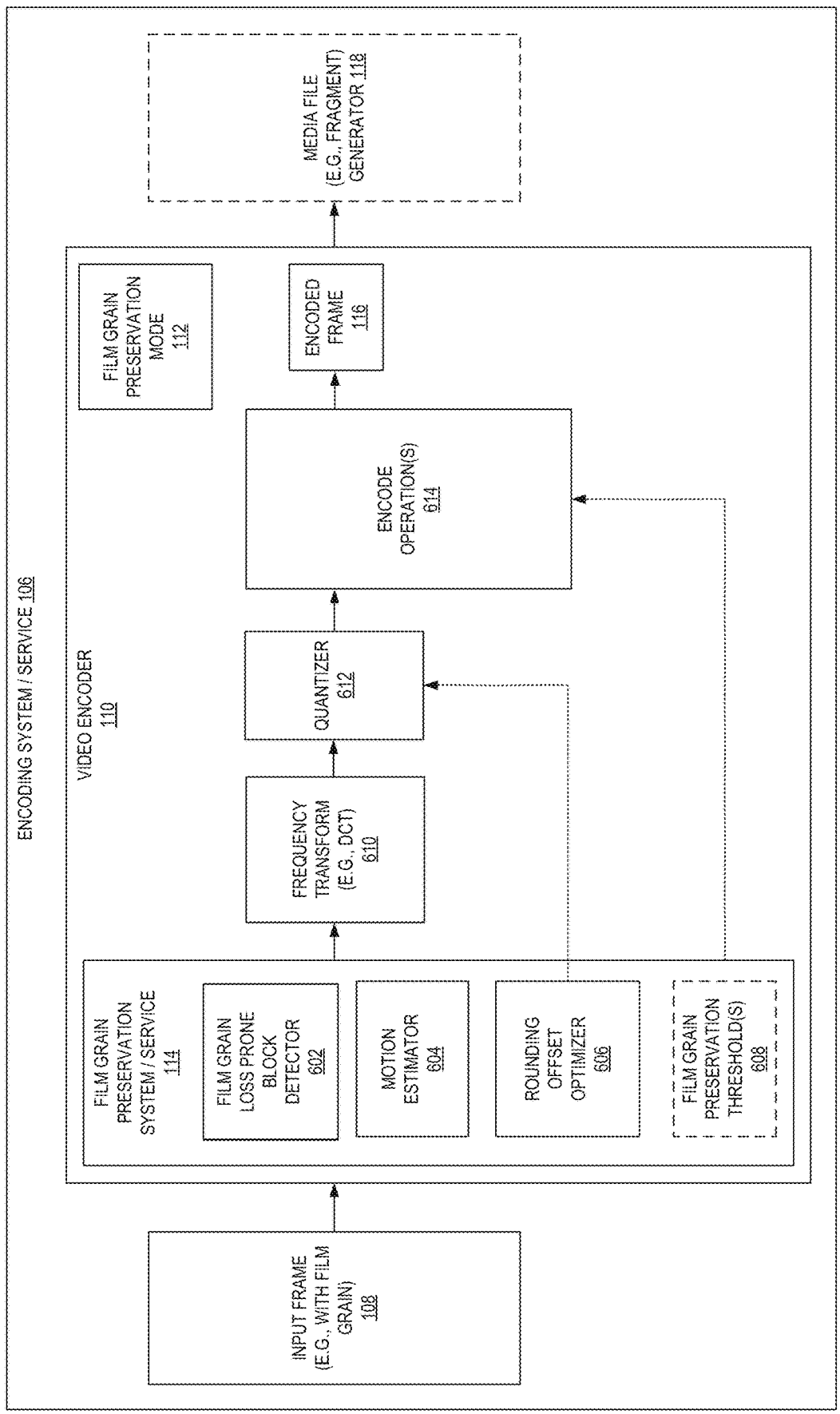
FIG. 6 is a diagram illustrating a video encoder including a film grain preservation mode according to some embodiments.

FIG. 6 is a diagram illustrating a video encoder 110 including a film grain preservation mode 112 according to some embodiments. FIG. 6 is a diagram illustrating a video encoder 110 including a film grain emulation mode 112 that utilizes film grain preservation system/service 114 to preserve certain film grain as discussed herein. In certain embodiments, video encoder system/service 106 (e.g., film grain preservation system/service 114 thereof) is to, for an input frame that includes film grain (e.g., an input frame that cumulatively includes film grain therein in the pixel values), generate an encoded frame 116.

In certain embodiments, film grain preservation system/service 114 includes one or more of: a film grain "loss prone block" detector 602, a motion estimator 604, and/or a rounding offset optimizer 606. In certain embodiments, film grain preservation system/service 114 includes one or more film grain perceptual fidelity (e.g., preservation) thresholds 608, e.g., lower and/or upper thresholds. In certain embodiments, the exceeding (or not exceeding) of a threshold causes film grain preservation system/service 114 to not preserve (or not attempt to preserve) film grain in an encoded frame and/or the not exceeding (or exceeding) of the threshold causes film grain preservation system/service 114 to preserve (or attempt to preserve) film grain in the encoded frame. In certain embodiments, film grain perceptual fidelity (e.g., preservation) threshold(s) 608 include a motion vector stationarity threshold and/or a texture threshold.

In certain embodiments, film grain "loss prone block" detector 602 detects which proper subset(s) of a frame, e.g., which proper subset of one or more blocks of the plurality of blocks of a frame, are to be selected as candidates for visibility (e.g., an increased visibility) of the original film grain from the input frame 108. In certain embodiments, motion estimator 604 estimates the motion in the frame, e.g., when compares to a (e.g., immediately) preceding frame and/or following frame in video order. Additionally or alternatively, in certain embodiments, the detected motion (for example, as a motion vector, e.g., in the pixel domain) is used to determine which proper subset of a frame, e.g., which proper subset of one or more blocks of the plurality of blocks of a frame, are to be selected as candidates for an increased visibility of the original film grain from the input frame 108. In certain embodiments, rounding offset optimizer 606 is to optimize the rounding offset (e.g., on a block-by-block granularity) to control the amount of film grain preserved, e.g., preserved in quantization by quantizer 612.

In certain embodiments, film grain preservation system/service 114 measures the visibility of film grain (e.g., in each block of a frame) and adjusts quantization and/or encoder decisions (e.g., from joint perceptual/bit usage sense), respectively.

In certain embodiments, the input frame's 108 pixel values are input into frequency transform 610 component that performs an (e.g., invertible) transform to concentrate randomness into fewer, decorrelated parameters, e.g., the discrete cosine transform (DCT). In certain embodiments, the output from frequency transform 610 is quantized by quantizer 612 component (e.g., according to a corresponding quantization matrix). In certain embodiments, the output (e.g., quantized coefficients of frame (or block)) from the quantizer 612 is then encoded by encode operation(s) 614 to generate encoded frame 116 (for example, that includes film grain therein, e.g., instead of as separate "film grain metadata"). In certain embodiments, the quantization parameter (QP) is a value that sets the amount of compression for every block (e.g., macroblock) in a frame, for example, with a large QP value indicating that there will be higher quantization by quantizer 612, and thus more compression and lower quality, and a lower QP value indicating the opposite. In one embodiment, the possible QP values range from 0 to 51, e.g., according to a (e.g., H.264 or H.265) video encoding (e.g., compression) standard. The embodiments herein may be performed once for brightness pixel values (e.g., of luma component Y) and once for each set of color pixel values (e.g., once for chrominance component U and once for chrominance component V).

In certain embodiments, a frame is a set of pixel values (e.g., luminance pixel values and/or chrominance pixel values), those pixel values are converted to the frequency domain by frequency transform 610 (e.g., DCT), and the frequency values quantized by quantizer 612, e.g., with the quantized frequency coefficient values encoded by encoding operations 614. Table 1 is an example of quantized frequency coefficient values for a frame with film grain.

TABLE 1

| −11 | −51 | 1  | −3 | 0 | 0  | 0 | 0  |
|-----|-----|----|----|---|----|---|----|
| −51 | 1   | 2  | 0  | 0 | 0  | 1 | 0  |
| 1   | 2   | −1 | −1 | 0 | 0  | 0 | 0  |
| −4  | 0   | −1 | 0  | 0 | 0  | 0 | 0  |
| 0   | 1   | −1 | 0  | 0 | 0  | 0 | 0  |
| −1  | 0   | 0  | 0  | 0 | 0  | 0 | −1 |
| 0   | 1   | 1  | 0  | 1 | 0  | 0 | −1 |
| −1  | 1   | 0  | 0  | 0 | −1 | 0 | 0  |

In certain embodiments, the coefficients of a frame (or block) with grain are quantized by quantizer 612, e.g., to form quantized coefficients of frame (or block) with grain. In certain embodiments, the encoding by encode operations 614 is performed on the quantized coefficients (e.g., a quantized coefficient matrix). In certain embodiments, film grain perceptual fidelity (e.g., preservation) system/service 114 adjusts the quantization control values and/or motion estimation control values.

Detection of Film Grain Sharpness Loss Prone Block

In certain embodiments, film grain "loss prone block" detector 602 performs one or more of the following.

In certain embodiments, film grain "loss prone block" detector 602 detects "film grain sharpness" "loss prone" block(s). In certain embodiments, e.g., where all blocks in the to-be-encoded content have film grain, preservation in all blocks via lowering quantization step is prohibitively costly from a bitrate perspective. Instead of targeting all blocks in a single frame, certain embodiments herein target the block(s) with a higher sensitivity to distortion, e.g., smoothness. In certain embodiments, the detection of a film grain sharpness loss prone block is done at certain two-dimensional block (e.g., 8×8) granularity using (i) a stationary (e.g., pseudo-stationary) measurement (e.g., and a corresponding motion vector stationarity threshold) and/or (ii) fine detail texture measurement (e.g., and a corresponding texture threshold).

Stationary Pseudo-Stationary Measurement

In certain embodiments, the pseudo stationary measure uses the results of motion estimator 604, e.g., the motion estimation in the presence of noise (e.g., where the motion is filtered to reduce small local variations). In certain embodiments, if the current block's motion vector Euclidean distance is below a defined threshold (e.g., Motion Threshold in (1) below), the block is classified as pseudo stationary and is a candidate for film grain preservation. In certain embodiments, this "stationarity" threshold (e.g., Motion-Threshold) is derived from resolution, frames per second (fps), and/or motion estimation temporal distance between reference frames. In certain embodiments, a frame (e.g., block thereof) is selected for film grain preservation (e.g., using more resources than encoding a frame (e.g., block thereof) that is not selected for film grain preservation) when the motion vector in the x-direction (MVx) and the motion vector in the y-direction (MVy) satisfy the conditions in equation (1).

$$\sqrt{MV^2x + MV^2y} < \text{MotionThreshold} \quad (1)$$

Fine Detail Texture Measurement

In certain embodiments, the fine detailed texture (which may be referred to as uniform texture) is defined as texture with low spatial activity, for example, film grain blocks with high distortion sensitivity are blocks with low spatial activity (e.g., low variance). Certain embodiments herein measure and classify the nature of the texture.

FIG. 7 illustrates a spatial frequency distribution diagram for an 8×8 DCT block 700 according to some embodiments. As shown in FIG. 7, each of the (e.g., 64) DCT coefficients is classified into one of the four coefficients classes: DC, low-frequency (LF), medium-frequency (MF) and high-frequency (HF). In certain embodiments, the sums of the absolute values of the corresponding coefficient classes are accumulated to get: L, M, and H, respectively. In certain embodiments, the texture energy is defined as:

$$TexE = M + H \quad (2)$$

In certain embodiments, a block is classified as uniform texture (e.g., and selected for film grain preservation) if satisfies the following conditions (e.g., where μ is a lower texture threshold and κ is an upper texture threshold):

$$\begin{cases} \text{if } (L+E)/H > \beta \\ \text{if } H > 0 \\ \text{if } \mu < TexE < \kappa \end{cases} \quad (3)$$

with $\beta = 4.8$, $\kappa$ is set to be 290, $\mu = 125$

Motion Estimation in Presence of Film Grain

In certain embodiments, motion estimator 604 performs one or more of the following.

In certain embodiments, the reduced temporal correlation of film grain challenges a block-based motion estimation. Similar phenomena are observed in content with heavy noise leading to random motion field. The produced motion field is chaotic even for stationary and smooth motion regions. The adverse effect of this random motion: a higher bit budget as motion estimation techniques like skip modes and direct modes are replaced with costlier modes, e.g., intra modes. Certain embodiments herein utilize a hierarchical motion estimation (e.g., pyramid) search to address this limitation.

Figure 8:
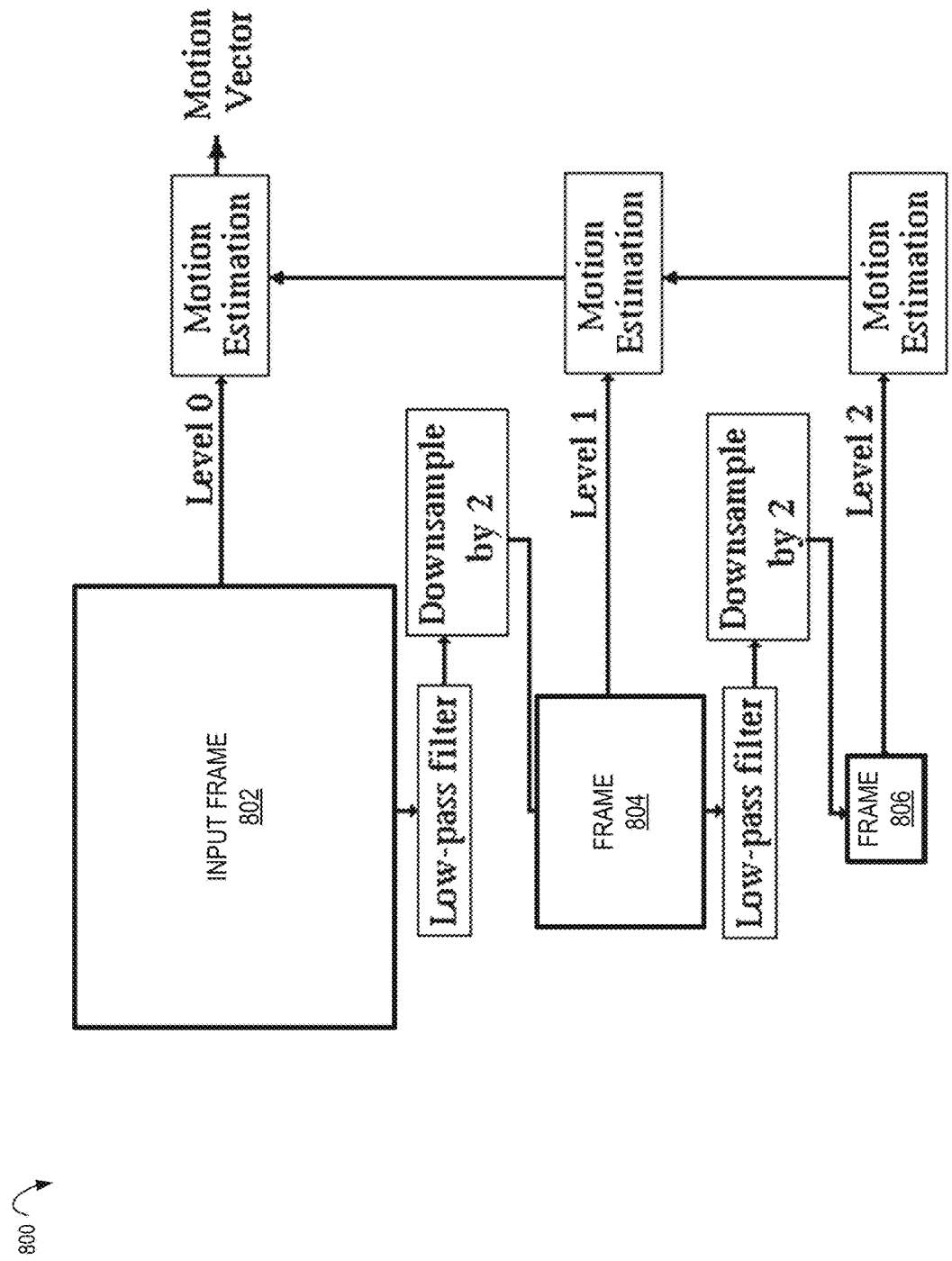
FIG. 8 illustrates a flowchart of a hierarchical motion field estimation algorithm according to some embodiments.

FIG. 8 illustrates a flowchart 800 of a hierarchical motion field estimation algorithm according to some embodiments. In FIG. 8, a motion estimation is performed at various levels (0, 1, and 2, although any other number may be utilized) on a frame 802 and downsampled versions 804, 806 of that frame. In FIG. 8, a filter is applied to the input frame 802, which is then downsampled (e.g., by decreasing the number of pixels from X to X/2) into frame 804, and frame 804 is then downsampled (e.g., by decreasing the number of pixels from X/2 to X/4) into frame 806. In certain embodiments, the different (e.g., pyramidal) images are constructed by sub-sampling, and a hierarchical search motion vector estimation proceeding from the higher level to the lower ones reduces the computational complexity and produces high quality motion vectors. In certain embodiments, to remove the effects of noise at higher level, image pyramids are constructed by using a low pass filter. In certain embodiments, a (e.g., 5×5) Gaussian kernel constitutes a good trade-off between denoising and computation:

$$\frac{1}{16}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} \quad (4)$$

Figure 9:
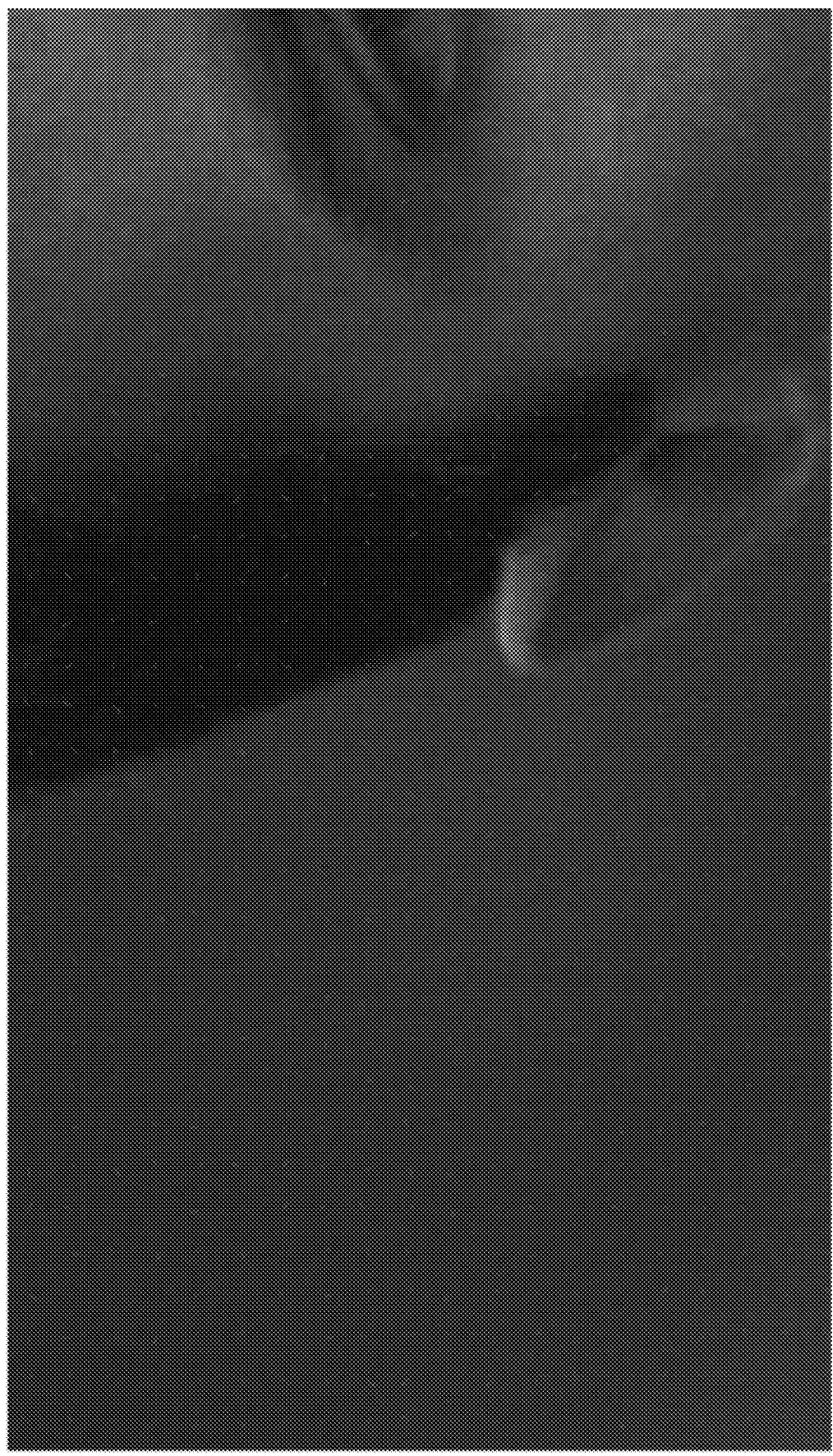
FIG. 9 illustrates motion vectors from a full motion estimation search overlaid on a frame according to some embodiments.
Figure 10:
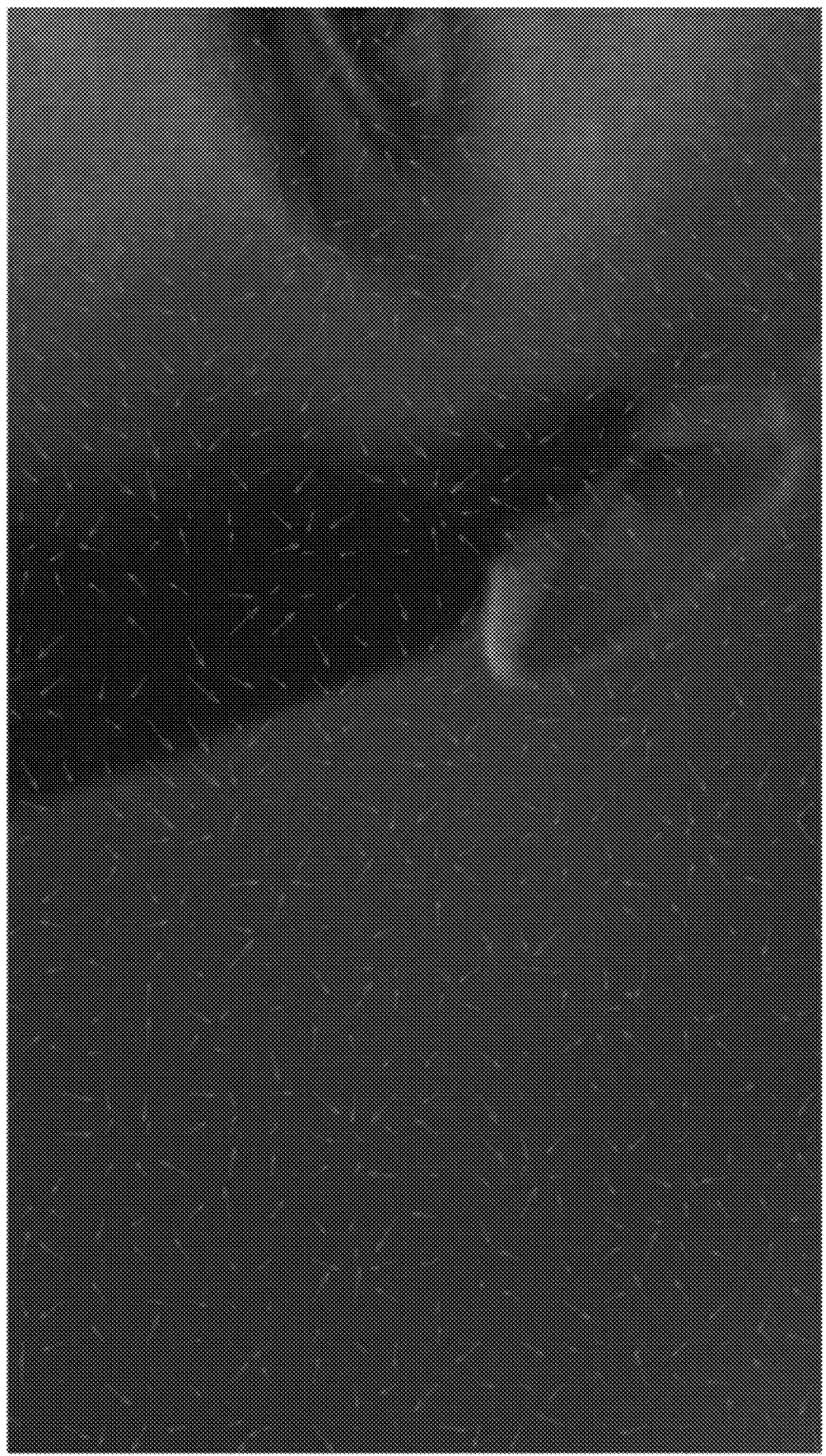
FIG. 10 illustrates motion vectors from a pyramidal estimation search overlaid on a frame according to some embodiments.

FIG. 9 illustrates motion vectors 900 (as arrows) from a full motion estimation search overlaid on a frame according to some embodiments. FIG. 10 illustrates motion vectors 1000 (as arrows) from a pyramidal estimation search overlaid on a frame according to some embodiments.

FIGS. 9-10 show the difference between a full motion estimation search where most of the regions are static, but motion vector are random. Using pyramidal search will reduce the randomness and improve both the cost and perception of film grain static areas.

Quantization: Perceptually Motivated Rounding Offset Optimization

In certain embodiments, rounding offset optimizer 606 performs one or more of the following, e.g., to adjust quantization control value(s).

In certain embodiments, in the quantization step of the encoder, the transform coefficients of the prediction error (e.g., residuals) are quantized. In certain embodiments, this quantization is used to reduce the precision of the coefficients, e.g., and utilize less bits to encode the corresponding part of the frame. Furthermore, in certain embodiments, the quantizer is designed to map insignificant coefficient values to zero while retaining a reduced number of significant, non-zero coefficients. In certain embodiments, the output of a quantizer is an array (e.g., 2D matrix) of quantized coefficients, e.g., mainly containing zeros. In certain embodiments, a uniform quantization (e.g., in a hybrid encoder) is expressed as:

$$Z = \text{floor}\left(\frac{|W| + f}{\Delta}\right) \times \text{sign}(W) \quad (5)$$

where the quantization maps transform residual signal W to a quantization level Z using a quantization step Δ. The rounding offset f (e.g., "dead-zone") is used to control the quantization error in certain embodiments. The dead zone definition is not part of the standard but the de facto definition of the dead zone f (for AVC and HEVC):

In certain embodiments, a dead-zone definition is not part of an encoding standard. In certain embodiments, the dead-zone f (e.g., for AVC and HEVC) is:

$$f = \frac{2^{15+QP/6}}{d} \quad (6)$$

where d is an empirical divider used to control the dead zone size and QP is the quantization parameter, e.g., with the smaller the value of d, the larger the value off and the smaller the dead-zone.

In certain codecs, the dead zone value f is defined as follows:
d=3 for Intra frames
d=6 for Inter frames In certain embodiments, the quantization process in many hybrid codecs (e.g., MPEG2, AVC, and HEVC) will try to preserve the lower frequencies by energy compaction and zero all the small AC coefficients, e.g., where AC are the other coefficients other than the DC coefficient in the upper left corner of a coefficient matrix.

Film grain quantization is challenging: higher quantization parameter will smooth out all the texture and the block is dull, but a smaller quantization parameter is bitrate costly due to the design of rounding offsets. In certain embodiments, to preserve film grain, smaller quantization steps are used, leading to a prohibitive increase in bandwidth in actual use. In certain embodiments, the use of smaller quantization steps is because film grain residuals are small and below the dead-zone and thus quantized to 0. Embodiments herein thus modify the dead-zone size to control the visibility and intensity of film grain, e.g., if the dead zone size is reduced, visibility of film grain is increased, and inversely if the dead-zone size is increased, the film grain is decreased (e.g., smoothed).

Instead of focusing quantization optimization (e.g., solely) on rate distortion optimized quantization (RDOQ), certain embodiments herein find an optimal Z quantized level from a rate distortion sense (e.g., in AVC or in HEVC), optimizing the dead-zone depending on content. As RDOQ operates on the actual quantized level, the cost of a non-optimal decision is higher than optimizing the dead-zone in certain embodiments. Another shortcoming of RDOQ is computational cost: RDOQ requires considerable amount of compute in certain embodiments. The proposed dead zone changes follow the same duality distortion quality, require less compute, and operates in a non-destructive way. In certain embodiments, the dead-zone decision is modeled as a perceptual optimization problem, e.g., what is the optimal dead zone that produces less bits for the best perceived video quality.

In certain embodiments, the adaptive dead zone scheme adapts (e.g., adjusts) the rounding offset at (i) a block level (e.g., offset the rounding offset depending on the perceptual importance of the block) and/or (ii) a coefficient level (e.g., use Contrast Sensitivity Function (CSF) to control the per-coefficient quantization).

In certain embodiments, the per-coefficient dead zone divider d defined as (e.g., where the adaptive dead zone will control the divider d in Equation (6) values using) (where i and j are the row and column indices for coefficients in a block, e.g., each being 0 to 7 in an 8×8 DCT matrix):

$$d_{i,j} = d_{block}(QP, MB_{stats}) \times \text{DeadZoneScale}_{i,j} \quad (7)$$

where the $d_{block}$ is the baseline divider: for every QP (e.g., and for every Luma/Chroma and/or Intra/Inter combination), a baseline rounding offset is defined. In certain embodiment, the baseline divider defines a sharpness level per QP, e.g., where the lower the QP, the more details have to be preserved, the sharper the image has to look, and the lower d is, and vice-versa for a higher QP, e.g., where bit preservation is the target, a softer image may be more pleasant to watch (e.g., where increasing sharpness for higher QP is not desirable because it will increase blocking artifacts).

In certain embodiments, the DeadZoneScale is a per-coefficient (e.g., per frequency coefficient in a DCT matrix) dead zone scale that will vary the rounding offset to control if a band of frequencies is preserved or not. In certain embodiments, to derive the DeadZoneScale, the concept of distortion visibility is used, e.g., the dead zone is controlled to reduce the visibility of loss of sharpness in film grain blocks. To derive the distortion visibility, in certain embodiments the following functions are used:

$$\omega_{i,j} = \sqrt{i^2 + j^2} / (2N\theta) \qquad (8)$$

$$\theta = 2 \times \arctan(1/2 \cdot R_{VH} \cdot H) \qquad (9)$$

where N is the DCT normalization factor for an N×N DCT block, θ indicates the horizontal/vertical length of a pixel in degrees of the visual angle, $\omega_{i,j}$ is cycles per degree (cpd) in spatial frequency for the $(i, j)^{th}$ DCT coefficient (e.g., where θ is considered identical in horizontal and vertical directions), $R_{VH}$ is the ratio of the viewing distance to the screen height, and H is the number of pixels in the screen height.

To derive the distortion visibility, in certain embodiments a Contrast Sensitivity Function is used:

$$CSF_{ij} = p_1 \cdot w_{ij}^2 + p_2 \cdot w_{ij} + p_3 \qquad (10)$$

where p1, p2 and p3 are empirically defined values to control the shape of the CSF surface.

In certain embodiments, the DeadZoneScale$_{ij}$ is defined as:

$$DeadZoneScale_{ij} = \min\left(1, \frac{CSF_{00}}{CSF_{ij}}\right) \qquad (11)$$

Figure 11:
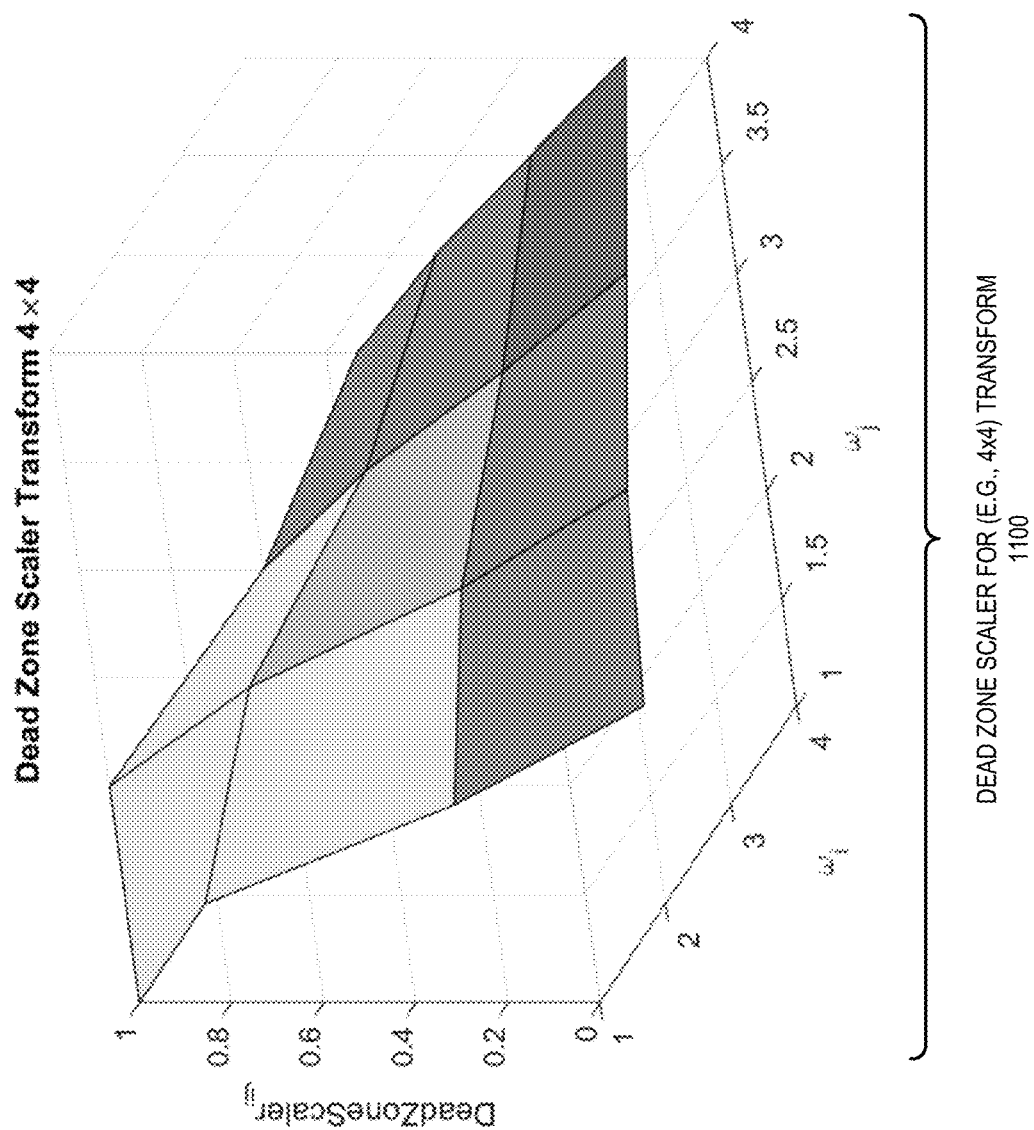
FIG. 11 is a diagram illustrating a dead zone scaler for a 4×4 transform according to some embodiments.

FIG. 11 is a diagram 1100 illustrating a dead zone scaler for a 4×4 transform according to some embodiments.

Embodiments herein provide a systematic approach to improve film grain compression, e.g., that can be generalized to any hybrid video compression system. Embodiments herein offer the benefits that: changes are decoder compliant (e.g., no changes in the decoder specification are required), low computation overhead that makes it suitable for any live or low latency application, small bitrate overhead, and the pleasing visual look of film grain that preserves the artistic intent at reduced bitrates.

Although the above is discussed for blocks, one of ordinary skill in the art should understand that this is applicable to other granularities, e.g., a per macroblock granularity for a single frame formed from a plurality of macroblocks.

Figure 12:
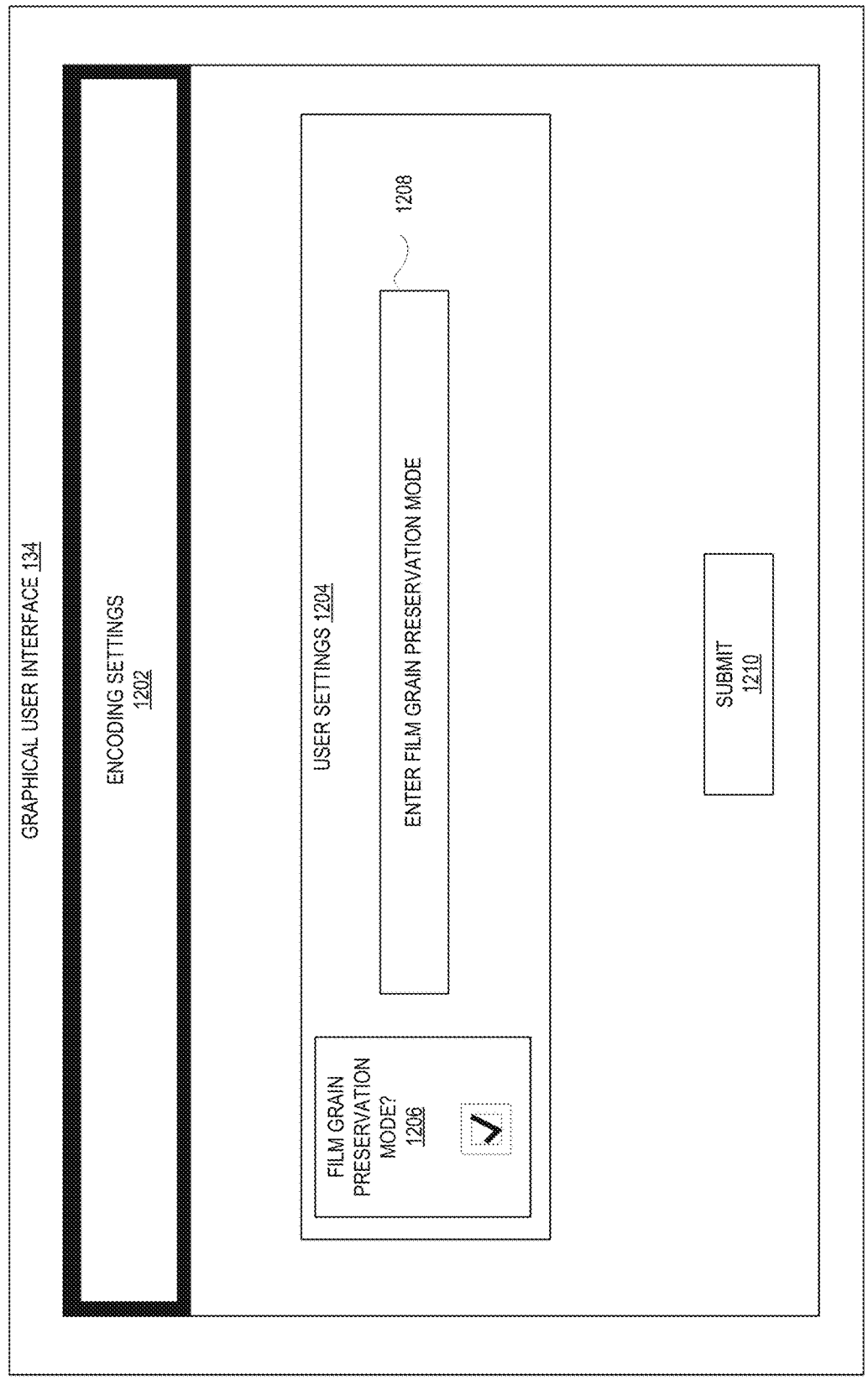
FIG. 12 is a diagram illustrating a graphical user interface for setting an encoding system/service to a film grain preservation mode according to some embodiments.

FIG. 12 is a diagram illustrating a graphical user interface 134 for setting an encoding system/service to a film grain preservation mode 112 according to some embodiments. Depicted graphical user interface 134 includes a field 1202 that is customizable with text to indicate that these are encoding settings, a field 1204 that is customizable with text to indicate that these are video (or image) encoding settings, an interface element 1206 that, when selected, will cause the content delivery system/service to enter film grain preservation mode 112, and a field 1208 that is customizable with text to indicate that selecting the interface element 1206 is to cause entry into film grain preservation mode. A user may click the submit interface element 1210 to (e.g., cause a command to be sent that causes) entry of a content delivery system/service into film grain preservation mode (e.g., film grain preservation mode 112 in FIGS. 1 and 6). An interface element, may include, but is not limited to, a thumbs up (or down), checkbox, button, dropdown menu, etc.

Figure 13:
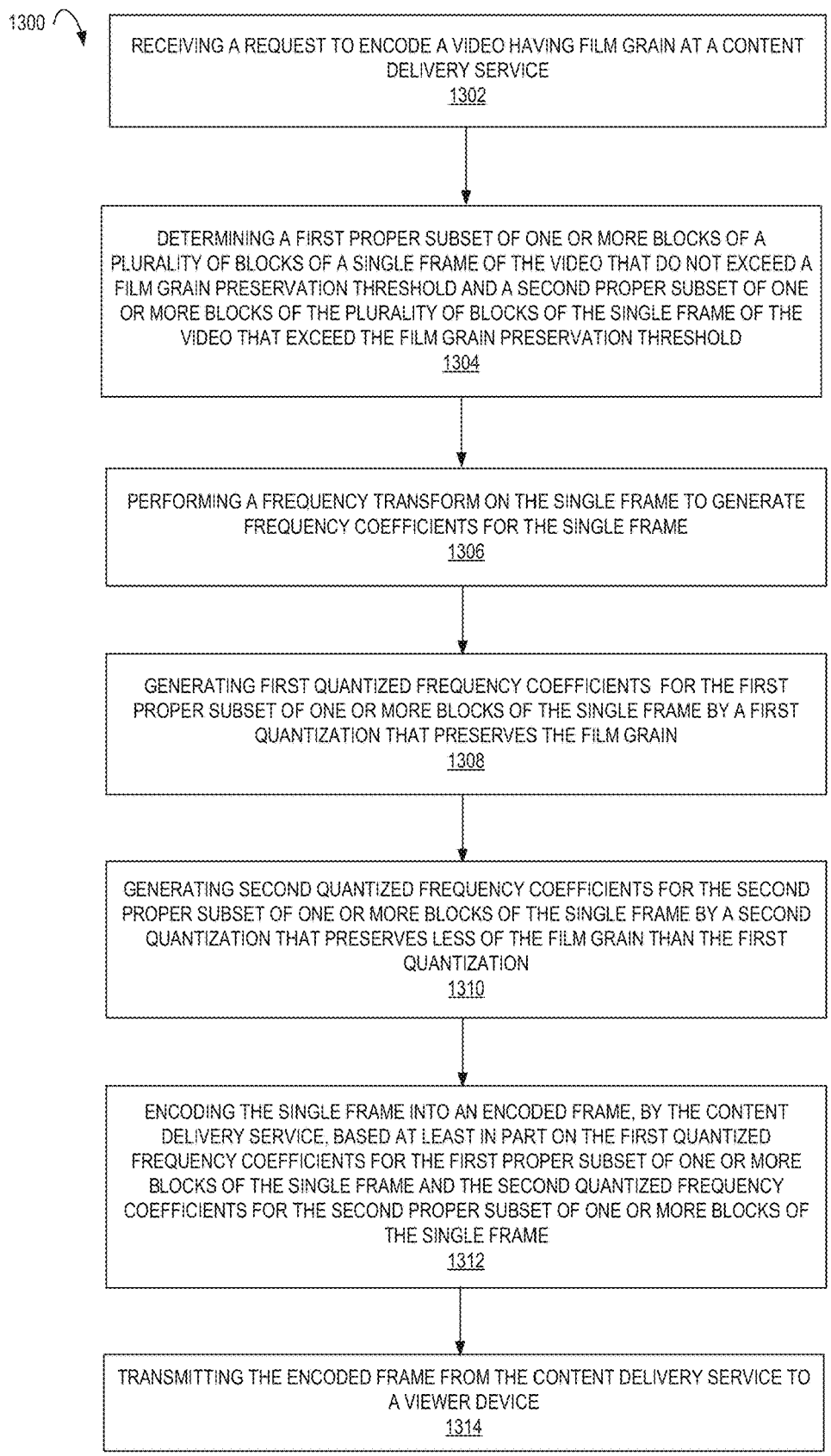
FIG. 13 is a flow diagram illustrating operations of a method for encoding a frame with selective film grain preservation according to some embodiments.

FIG. 13 is a flow diagram illustrating operations 1300 of a method for encoding a frame with selective film grain preservation according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1300 are performed by content delivery system/service (or a component thereof) of the other figures.

The operations 1300 include, at block 1302, receiving a request to encode a video having film grain at a content delivery service. The operations 1300 further include, at block 1304, determining a first proper subset of one or more blocks of a plurality of blocks of a single frame of the video that do not exceed a film grain preservation threshold and a second proper subset of one or more blocks of the plurality of blocks of the single frame of the video that exceed the film grain preservation threshold. The operations 1300 further include, at block 1306, performing a frequency transform on the single frame to generate frequency coefficients for the single frame. The operations 1300 further include, at block 1308, generating first quantized frequency coefficients for the first proper subset of one or more blocks of the single frame by a first quantization that preserves the film grain. The operations 1300 further include, at block 1310, generating second quantized frequency coefficients for the second proper subset of one or more blocks of the single frame by a second quantization that preserves less of the film grain than the first quantization. The operations 1300 further include, at block 1312, encoding the single frame into an encoded frame, by the content delivery service, based at least in part on the first quantized frequency coefficients for the first proper subset of one or more blocks of the single frame and the second quantized frequency coefficients for the second proper subset of one or more blocks of the single frame. The operations 1300 further include, at block 1314, transmitting the encoded frame from the content delivery service to a viewer device.

Exemplary environments, systems, etc. that the above may be used in are detailed below.

At least some embodiments of the disclosed technologies can be described in view of the following examples:
Example 1. A computer-implemented method comprising:
receiving a request to encode a video having film grain at a content delivery service;
determining a first proper subset of one or more blocks of a plurality of blocks of a single frame of the video that do not exceed a film grain preservation threshold and a second proper subset of one or more blocks of the plurality of blocks of the single frame of the video that exceed the film grain preservation threshold;
performing a frequency transform on the single frame to generate frequency coefficients for the single frame;

generating first quantized frequency coefficients for the first proper subset of one or more blocks of the single frame by a first quantization that preserves the film grain;

generating second quantized frequency coefficients for the second proper subset of one or more blocks of the single frame by a second quantization that preserves less of the film grain than the first quantization;

encoding the single frame into an encoded frame, by the content delivery service, based at least in part on the first quantized frequency coefficients for the first proper subset of one or more blocks of the single frame and the second quantized frequency coefficients for the second proper subset of one or more blocks of the single frame; and transmitting the encoded frame from the content delivery service to a viewer device.

Example 2. The computer-implemented method of example 1, wherein the generating the first quantized frequency coefficients comprises utilizing a first rounding offset in the first quantization, and the generating the second quantized frequency coefficients comprises utilizing a second rounding offset, different than the first rounding offset, in the second quantization.

Example 3. The computer-implemented method of example 1, wherein the film grain preservation threshold comprises a motion vector stationarity threshold and a texture threshold.

Example 4. A computer-implemented method comprising:

receiving a request to encode a video having film grain;

determining a first proper subset of one or more blocks of a plurality of blocks of a single frame of the video that exceed a film grain perceptual fidelity threshold and a second proper subset of one or more blocks of the plurality of blocks of the single frame of the video that do not exceed the film grain perceptual fidelity threshold;

determining a first set of encoding parameters for the first proper subset of one or more blocks;

determining a second set of encoding parameters, different than the first set of encoding parameters, for the second proper subset of one or more blocks;

encoding the single frame into an encoded frame based at least in part on the first set of encoding parameters and the second set of encoding parameters; and transmitting the encoded frame to a viewer device.

Example 5. The computer-implemented method of example 4, wherein the encoding parameters are quantization control values.

Example 6. The computer-implemented method of example 5, wherein:

the determining the first set of encoding parameters comprises determining a first rounding offset in a first quantization of the first proper subset of one or more blocks; and the determining the second set of encoding parameters comprises determining (e.g., in parallel with the determining the first rounding offset) a second rounding offset, different than the first rounding offset, in a second quantization of the second proper subset of one or more blocks.

Example 7. The computer-implemented method of example 6, wherein:

the determining the first rounding offset in the first quantization of the first proper subset of one or more blocks comprises determining the first rounding offset on a per block basis for the first proper subset of one or more blocks; and the determining the second rounding offset in the second quantization of the second proper subset of one or more blocks comprises determining the second rounding offset on a per block basis for the second proper subset of one or more blocks.

Example 8. The computer-implemented method of example 6, wherein:

the determining the first rounding offset in the first quantization of the first proper subset of one or more blocks comprises determining the first rounding offset on a per coefficient basis for the first proper subset of one or more blocks; and the determining the second rounding offset in the second quantization of the second proper subset of one or more blocks comprises determining the second rounding offset on a per coefficient basis for the second proper subset of one or more blocks.

Example 9. The computer-implemented method of example 4, wherein the film grain perceptual fidelity threshold comprises a motion vector stationarity threshold.

Example 10. The computer-implemented method of example 9, wherein the determining the second proper subset of one or more blocks of the plurality of blocks of the single frame of the video that do not exceed the film grain perceptual fidelity threshold comprises performing a hierarchical search motion vector estimation to generate motion vectors for at least the second proper subset of one or more blocks and determining that a value based on the motion vectors does not exceed the motion vector stationarity threshold.

Example 11. The computer-implemented method of example 9, wherein the film grain perceptual fidelity threshold comprises a texture threshold.

Example 12. The computer-implemented method of example 4, wherein the film grain perceptual fidelity threshold comprises a texture threshold.

Example 13. The computer-implemented method of example 12, wherein the determining the second proper subset of one or more blocks of the plurality of blocks of the single frame of the video that do not exceed the film grain perceptual fidelity threshold comprises determining a texture energy for at least the second proper subset of one or more blocks and determining that a value based on the texture energy does not exceed the texture threshold.

Example 14. The computer-implemented method of example 4, wherein the encoding parameters are motion estimation control values.

Example 15. A system comprising:

a content data store to store a video having film grain; and one or more electronic devices to implement a content delivery service, the content delivery service including instructions that upon execution cause the content delivery service to perform operations comprising:

receiving a request to encode the video having film grain, determining a first proper subset of one or more blocks of a plurality of blocks of a single frame of the video that exceed a film grain perceptual fidelity threshold and a second proper subset of one or more blocks of the plurality of blocks of the single frame of the video that do not exceed the film grain perceptual fidelity threshold, determining a first set of encoding parameters for the first proper subset of one or more blocks, determining a second set of encoding parameters, different than the first set of encoding parameters, for the second proper subset of one or more blocks, encoding the single frame into an encoded frame based at least in part on the first set of encoding parameters and the second set of encoding parameters, and transmitting the encoded frame to a viewer device.

Example 16. The system of example 15, wherein the encoding parameters are quantization control values.

Example 17. The system of example 16, wherein the instructions upon execution cause the content delivery service to perform operations wherein:

the determining the first set of encoding parameters comprises determining a first rounding offset in a first quantization of the first proper subset of one or more blocks; and the determining the second set of encoding parameters comprises determining a second rounding offset, different than the first rounding offset, in a second quantization of the second proper subset of one or more blocks.

Example 18. The system of example 17, wherein the instructions upon execution cause the content delivery service to perform operations wherein:

the determining the first rounding offset in the first quantization of the first proper subset of one or more blocks comprises determining the first rounding offset on a per block basis for the first proper subset of one or more blocks; and the determining the second rounding offset in the second quantization of the second proper subset of one or more blocks comprises determining the second rounding offset on a per block basis for the second proper subset of one or more blocks.

Example 19. The system of example 17, wherein the instructions upon execution cause the content delivery service to perform operations wherein:

the determining the first rounding offset in the first quantization of the first proper subset of one or more blocks comprises determining the first rounding offset on a per coefficient basis for the first proper subset of one or more blocks; and the determining the second rounding offset in the second quantization of the second proper subset of one or more blocks comprises determining the second rounding offset on a per coefficient basis for the second proper subset of one or more blocks.

Example 20. The system of example 15, wherein the film grain perceptual fidelity threshold comprises a motion vector stationarity threshold and a texture threshold.

Figure 14:
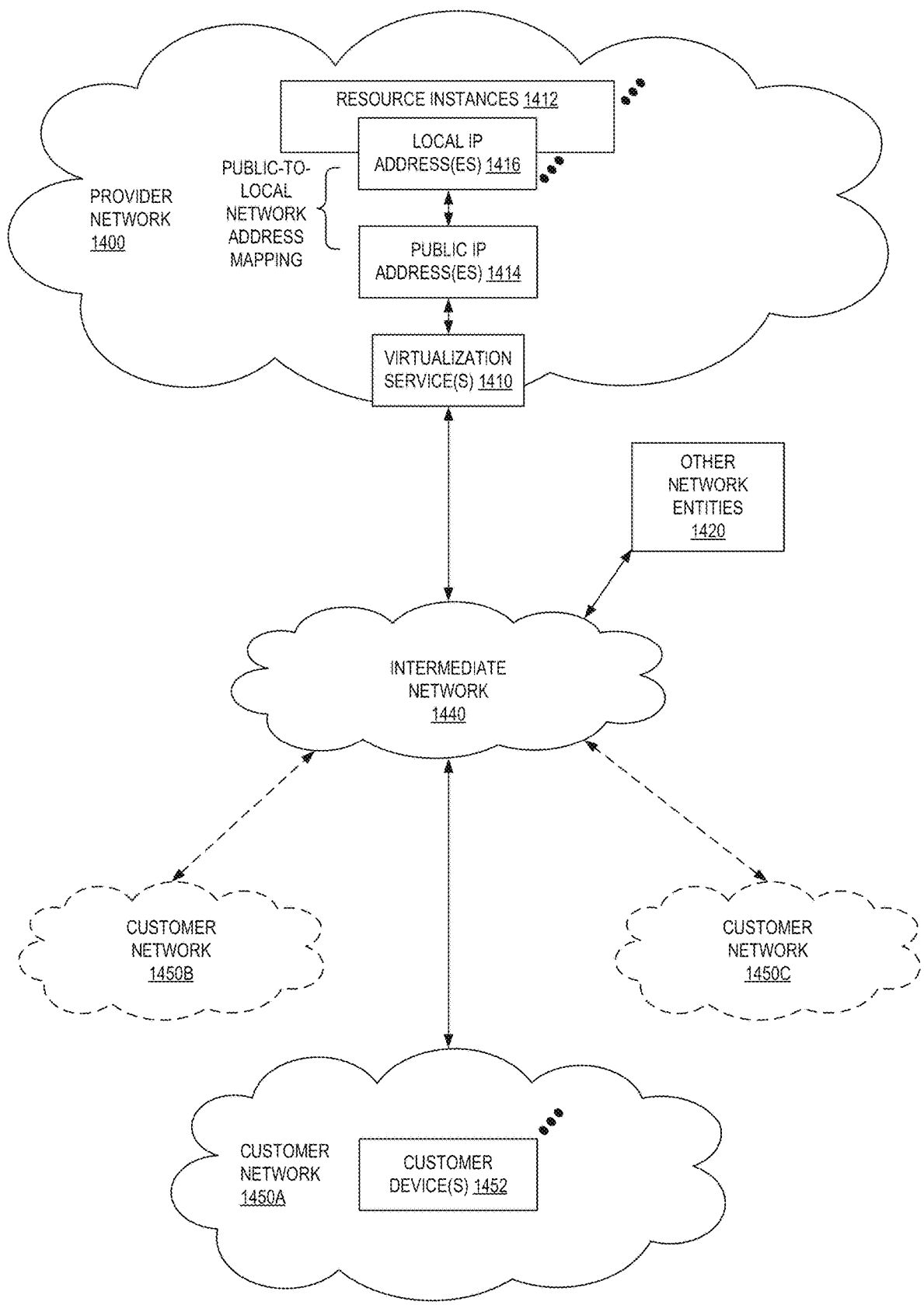
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
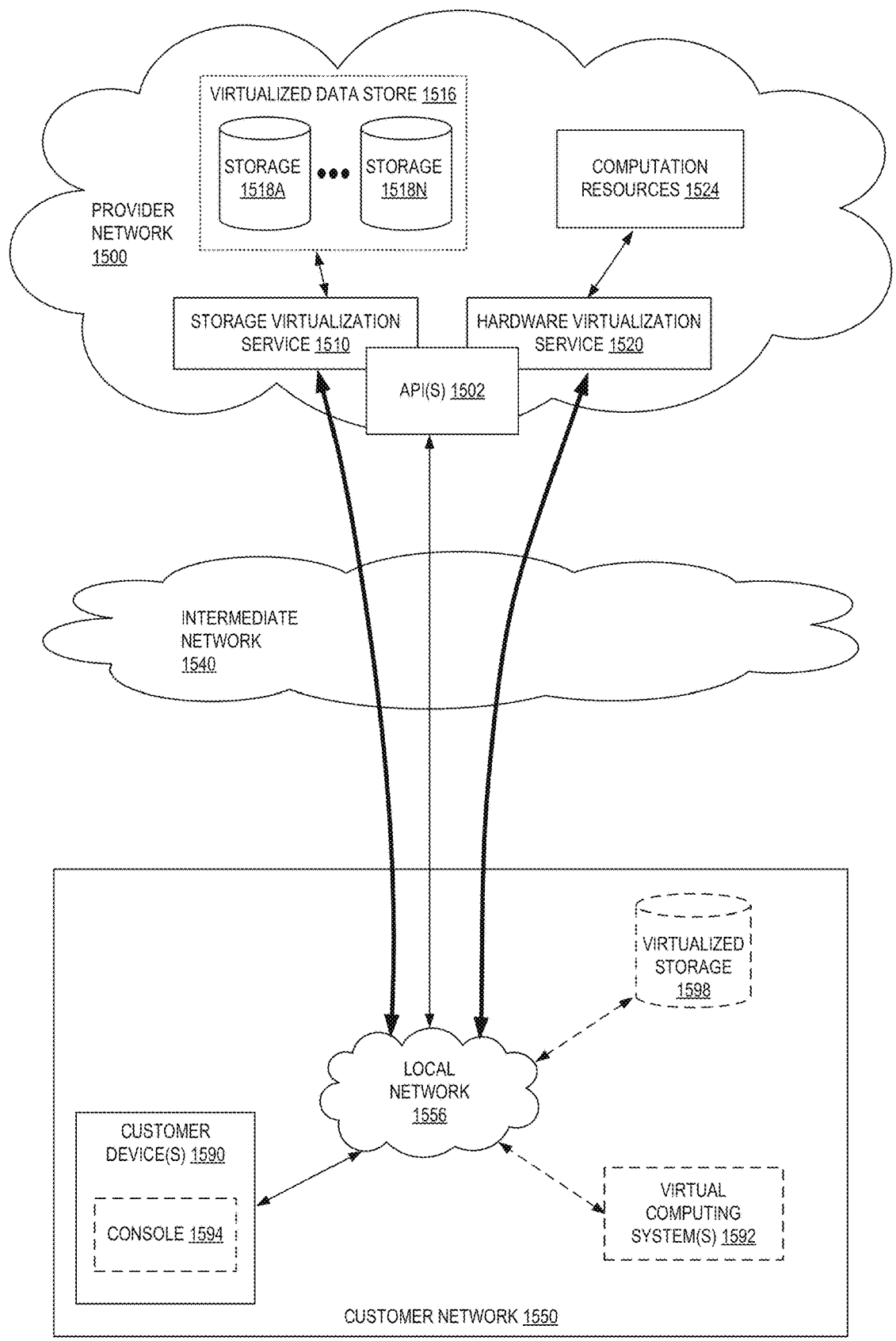
FIG. 15 is a block diagram of an example provider network that provides a storage service and a hardware virtualization service to customers according to some embodiments.

FIG. 15 is a block diagram of an example provider network that provides a storage service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative System

Figure 16:
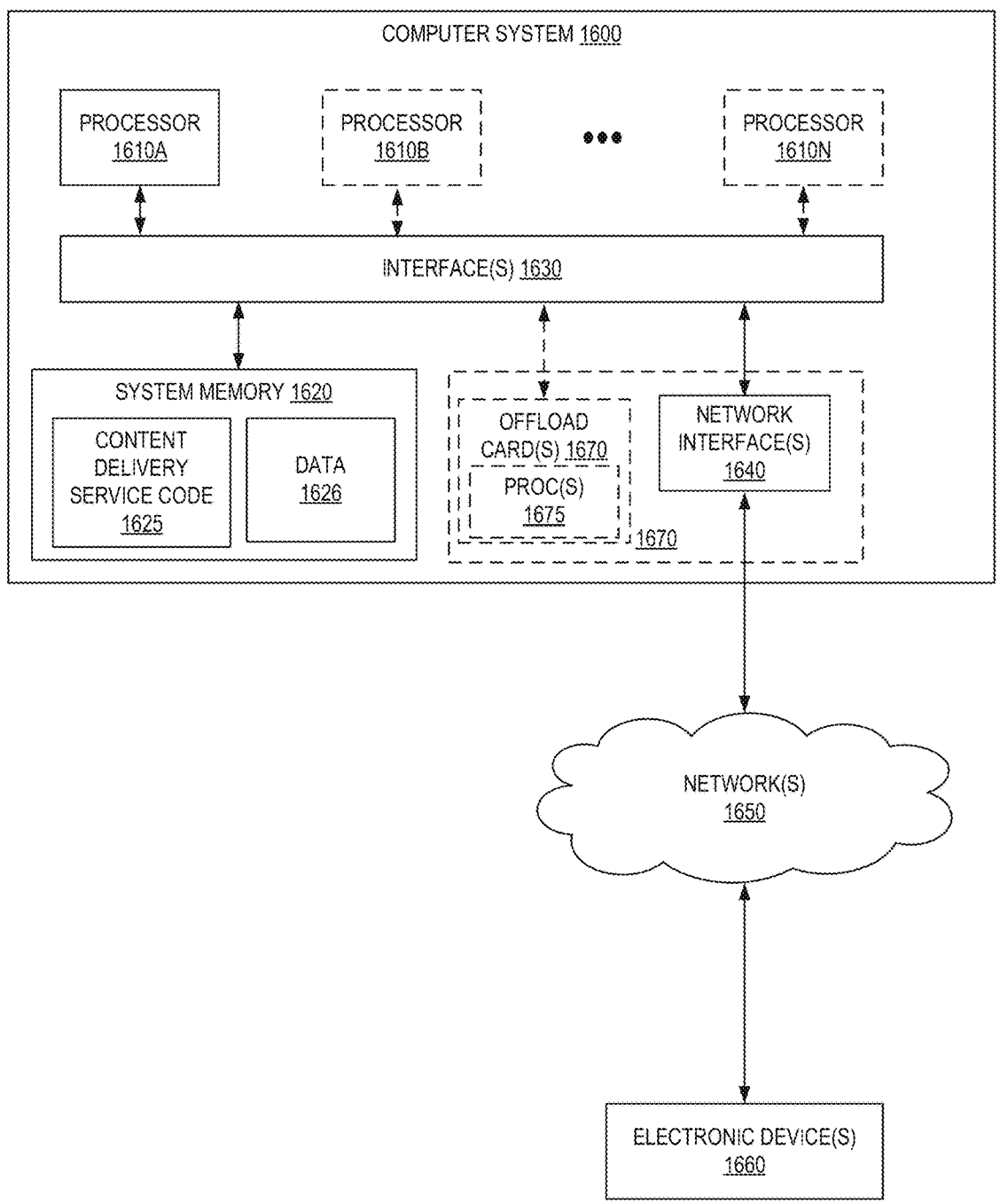
FIG. 16 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as content delivery service code 1625 (e.g., executable to implement, in whole or in part, the content delivery service 102) and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing, or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
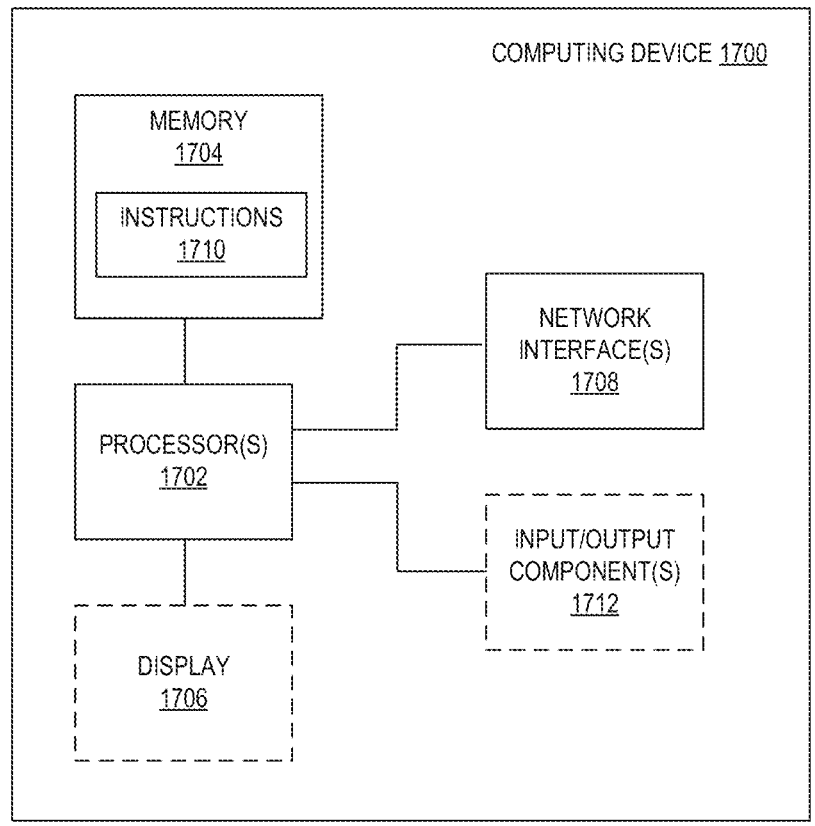
FIG. 17 illustrates a logical arrangement of a set of general components of an exemplary computing device that can be utilized in accordance with various embodiments.

FIG. 17 illustrates a logical arrangement of a set of general components of an example computing device 1700. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (for example, instructions 1710, e.g., which implement a content delivery service as disclosed herein), and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1710) for execution on the set of one or more processors 1702 of that electronic device. One or more parts of various embodiments may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some embodiments include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 18:
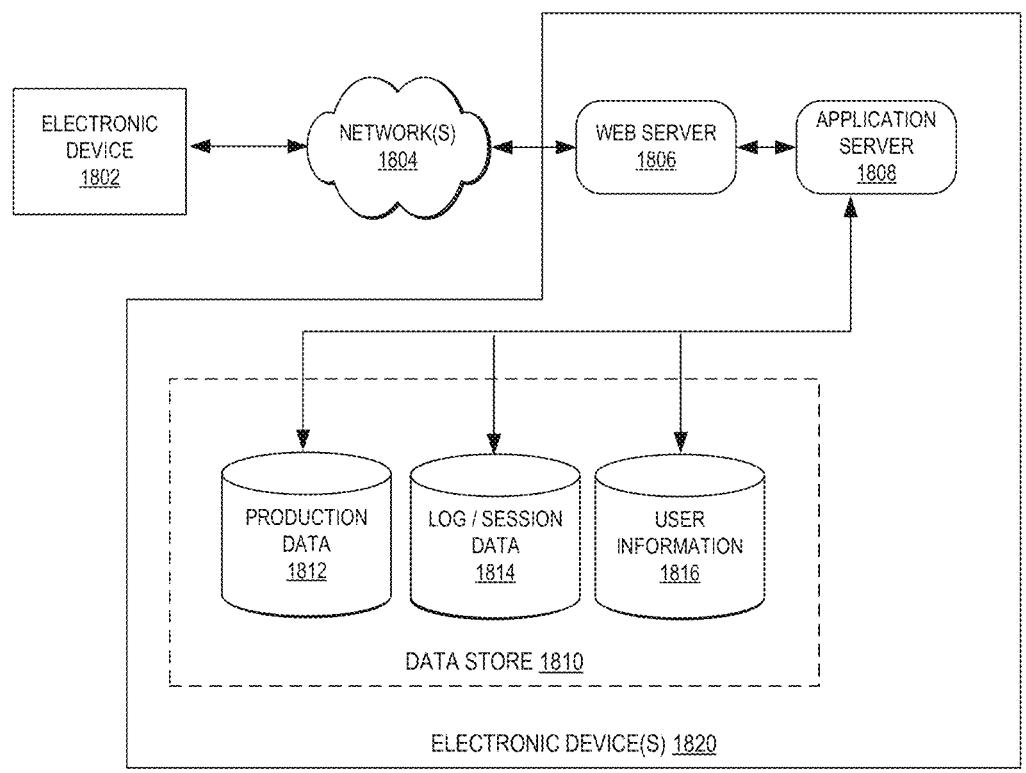
FIG. 18 illustrates an example of an environment for implementing aspects in accordance with various embodiments.

As discussed, different approaches can be implemented in various environments in accordance with the described embodiments. For example, FIG. 18 illustrates an example of an environment 1800 for implementing aspects in accordance with various embodiments. For example, in some embodiments messages are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various embodiments. The system includes an electronic client device 1802, which may also be referred to as a client device and can be any appropriate device operable to send and receive requests, messages, or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®. Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1518A-1518N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to encode a video having film grain at a content delivery service;
determining a first proper subset of one or more blocks of a plurality of blocks of a single frame of the video that do not exceed a motion vector stationarity threshold and a second proper subset of one or more blocks of the plurality of blocks of the single frame of the video that exceed the motion vector stationarity threshold;
performing a frequency transform on the single frame to generate frequency coefficients for the single frame;
generating first quantized frequency coefficients for the first proper subset of one or more blocks of the single frame by a first quantization that preserves the film grain;
generating second quantized frequency coefficients for the second proper subset of one or more blocks of the single frame by a second quantization that preserves less of the film grain than the first quantization;
encoding the single frame into an encoded frame, by the content delivery service, based at least in part on the first quantized frequency coefficients for the first proper subset of one or more blocks of the single frame and the second quantized frequency coefficients for the second proper subset of one or more blocks of the single frame; and
transmitting the encoded frame from the content delivery service to a viewer device.

2. The computer-implemented method of claim 1, wherein the generating the first quantized frequency coefficients comprises utilizing a first rounding offset in the first quantization, and the generating the second quantized frequency coefficients comprises utilizing a second rounding offset, different than the first rounding offset, in the second quantization.

3. The computer-implemented method of claim 1, further comprising determining that the first proper subset of the one or more blocks of the plurality of blocks of the single frame of the video do not exceed a texture threshold and that the second proper subset of the one or more blocks of the plurality of blocks of the single frame of the video exceed the texture threshold.

4. A computer-implemented method comprising:
receiving a request to encode a video having film grain;
determining a first proper subset of one or more blocks of a plurality of blocks of a single frame of the video that exceed a film grain perceptual fidelity threshold that includes a motion vector stationarity threshold, and a second proper subset of one or more blocks of the plurality of blocks of the single frame of the video that do not exceed the film grain perceptual fidelity threshold that includes the motion vector stationarity threshold;
determining a first set of encoding parameters for the first proper subset of one or more blocks;
determining a second set of encoding parameters, different than the first set of encoding parameters, for the second proper subset of one or more blocks;
encoding the single frame into an encoded frame based at least in part on the first set of encoding parameters and the second set of encoding parameters; and
transmitting the encoded frame to a viewer device.

5. The computer-implemented method of claim 4, wherein the encoding parameters are quantization control values.

6. The computer-implemented method of claim 5, wherein:
the determining the first set of encoding parameters comprises determining a first rounding offset in a first quantization of the first proper subset of one or more blocks; and
the determining the second set of encoding parameters comprises determining a second rounding offset, different than the first rounding offset, in a second quantization of the second proper subset of one or more blocks.

7. The computer-implemented method of claim 6, wherein:
the determining the first rounding offset in the first quantization of the first proper subset of one or more blocks comprises determining the first rounding offset on a per block basis for the first proper subset of one or more blocks; and
the determining the second rounding offset in the second quantization of the second proper subset of one or more blocks comprises determining the second rounding offset on a per block basis for the second proper subset of one or more blocks.

8. The computer-implemented method of claim 6, wherein:
the determining the first rounding offset in the first quantization of the first proper subset of one or more blocks comprises determining the first rounding offset on a per coefficient basis for the first proper subset of one or more blocks; and
the determining the second rounding offset in the second quantization of the second proper subset of one or more blocks comprises determining the second rounding offset on a per coefficient basis for the second proper subset of one or more blocks.

9. The computer-implemented method of claim 4, wherein the determining the second proper subset of one or more blocks of the plurality of blocks of the single frame of the video that do not exceed the film grain perceptual fidelity threshold comprises performing a hierarchical search motion vector estimation to generate motion vectors for at least the second proper subset of one or more blocks and determining that a value based on the motion vectors does not exceed the motion vector stationarity threshold.

10. The computer-implemented method of claim 4, wherein the film grain perceptual fidelity threshold comprises a texture threshold.

11. The computer-implemented method of claim 10, wherein the determining the second proper subset of one or more blocks of the plurality of blocks of the single frame of the video that do not exceed the film grain perceptual fidelity threshold comprises determining a texture energy for at least the second proper subset of one or more blocks and determining that a value based on the texture energy does not exceed the texture threshold.

12. The computer-implemented method of claim 4, wherein the encoding parameters are motion estimation control values.

13. A system comprising:
a content data store to store a video having film grain; and
one or more electronic devices to implement a content delivery service, the content delivery service including instructions that upon execution cause the content delivery service to perform operations comprising:

receiving a request to encode the video having film grain, determining a first proper subset of one or more blocks of a plurality of blocks of a single frame of the video that exceed a film grain perceptual fidelity threshold that includes a motion vector stationarity threshold, and a second proper subset of one or more blocks of the plurality of blocks of the single frame of the video that do not exceed the film grain perceptual fidelity threshold that includes the motion vector stationarity threshold, determining a first set of encoding parameters for the first proper subset of one or more blocks, determining a second set of encoding parameters, different than the first set of encoding parameters, for the second proper subset of one or more blocks, encoding the single frame into an encoded frame based at least in part on the first set of encoding parameters and the second set of encoding parameters, and transmitting the encoded frame to a viewer device.

14. The system of claim 13, wherein the encoding parameters are quantization control values.

15. The system of claim 14, wherein the instructions upon execution cause the content delivery service to perform operations wherein:

the determining the first set of encoding parameters comprises determining a first rounding offset in a first quantization of the first proper subset of one or more blocks; and the determining the second set of encoding parameters comprises determining a second rounding offset, different than the first rounding offset, in a second quantization of the second proper subset of one or more blocks.

16. The system of claim 15, wherein the instructions upon execution cause the content delivery service to perform operations wherein:

the determining the first rounding offset in the first quantization of the first proper subset of one or more blocks comprises determining the first rounding offset on a per block basis for the first proper subset of one or more blocks; and the determining the second rounding offset in the second quantization of the second proper subset of one or more blocks comprises determining the second rounding offset on a per block basis for the second proper subset of one or more blocks.

17. The system of claim 15, wherein the instructions upon execution cause the content delivery service to perform operations wherein:

the determining the first rounding offset in the first quantization of the first proper subset of one or more blocks comprises determining the first rounding offset on a per coefficient basis for the first proper subset of one or more blocks; and the determining the second rounding offset in the second quantization of the second proper subset of one or more blocks comprises determining the second rounding offset on a per coefficient basis for the second proper subset of one or more blocks.

18. The system of claim 13, wherein the film grain perceptual fidelity threshold further comprises a texture threshold.

* * * * *